(12) United States Patent
Wang et al.

(10) Patent No.: US 12,181,926 B2
(45) Date of Patent: Dec. 31, 2024

(54) SUPPORT APPARATUS

(71) Applicant: Honor Device Co., Ltd., Shenzhen (CN)

(72) Inventors: Xing Wang, Shenzhen (CN); Haojie Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/003,428

(22) PCT Filed: Aug. 29, 2022

(86) PCT No.: PCT/CN2022/115513
§ 371 (c)(1),
(2) Date: Dec. 27, 2022

(87) PCT Pub. No.: WO2023/061070
PCT Pub. Date: Apr. 20, 2023

(65) Prior Publication Data
US 2024/0103579 A1    Mar. 28, 2024

(30) Foreign Application Priority Data
Oct. 11, 2021  (CN) .......................... 202111183597.4

(51) Int. Cl.
G06F 1/16        (2006.01)
G06F 3/0354   (2013.01)

(52) U.S. Cl.
CPC ........ *G06F 1/1656* (2013.01); *G06F 3/03545* (2013.01)

(58) Field of Classification Search
CPC ....................................................... G06F 1/16
See application file for complete search history.

(56) References Cited

U.S. PATENT DOCUMENTS

| | | | |
|---|---|---|---|
| 11,079,865 B2 | 8/2021 | Kobori | |
| 11,281,254 B2 | 3/2022 | Lee et al. | |
| 11,995,251 B2 | 5/2024 | Wang et al. | |
| 2014/0035887 A1 | 2/2014 | Jong-Hae | |
| 2017/0060180 A1* | 3/2017 | Griffin, II | G06F 1/1669 |
| 2017/0097698 A1* | 4/2017 | Maeshima | G06F 3/03545 |
| 2018/0059817 A1 | 3/2018 | Pirie et al. | |

(Continued)

FOREIGN PATENT DOCUMENTS

| | | |
|---|---|---|
| CN | 201315614 Y | 9/2009 |
| CN | 102458070 A | 5/2012 |

(Continued)

*Primary Examiner* — Jerry Wu
(74) *Attorney, Agent, or Firm* — Conley Rose, P.C.

(57) ABSTRACT

A support apparatus is configured to fasten a stylus, a magnet of the stylus includes a first wall surface and a second wall surface facing away from the first wall surface, and a polarity of the first wall surface is opposite to that of the second wall surface. The support apparatus includes a main body, a support frame, a connecting part, and a stylus fastener; the stylus fastener includes an annular body and a mounting space formed by the body, the body is magnetic and includes an inner wall surface and an outer wall surface, and a polarity of the inner wall surface is opposite to that of the outer wall surface; the stylus is configured to mount in the mounting space.

19 Claims, 16 Drawing Sheets

(56) References Cited

U.S. PATENT DOCUMENTS

| | | | |
|---|---|---|---|
| 2021/0080998 | A1 | 3/2021 | Yoshihito |
| 2021/0116962 | A1 | 4/2021 | Lee et al. |
| 2021/0191473 | A1 | 6/2021 | Kuo |
| 2021/0208635 | A1 | 7/2021 | Wang et al. |
| 2022/0142315 | A1 | 5/2022 | Wang et al. |

FOREIGN PATENT DOCUMENTS

| | | |
|---|---|---|
| CN | 207067941 U | 3/2018 |
| CN | 108363458 A | 8/2018 |
| CN | 109542254 A | 3/2019 |
| CN | 210697657 U | 6/2020 |
| CN | 210864654 U | 6/2020 |
| CN | 211375567 U | 8/2020 |
| CN | 111897446 A | 11/2020 |
| CN | 112640407 A | 4/2021 |
| CN | 213210861 U | 5/2021 |
| CN | 113253855 A | 8/2021 |
| CN | 213957935 U | 8/2021 |
| CN | 214312133 U | 9/2021 |
| CN | 113253855 B | 7/2022 |
| KR | 1020150010386 A | 1/2015 |
| KR | 20180001454 A | 1/2018 |
| KR | 20210014252 A | 2/2021 |
| KR | 20210045668 A | 4/2021 |
| WO | 2021201512 A1 | 10/2021 |

* cited by examiner

SUPPORT APPARATUS

CROSS-REFERENCE TO RELATED APPLICATIONS

This application is a U.S. National Stage of International Application No. PCT/CN2022/115513 filed on Aug. 29, 2022, which claims priority to Chinese Patent Application No. 202111183597.4, filed with the China National Intellectual Property Administration on Oct. 11, 2021, both of which are incorporated herein by reference in their entireties.

This application claims priority to Chinese Patent Application No. 2021111835974, filed with the China National Intellectual Property Administration on Oct. 11, 2021 and entitled "SUPPORT APPARATUS", which is incorporated herein by reference in its entirety.

TECHNICAL FIELD

This application relates to the field related to accessories of electronic devices, and in particular, to a support apparatus.

BACKGROUND

With rapid development of Internet technologies, various electronic products have become an indispensable part of daily work and life. Touch electronic devices have been applied to work and study by more and more people with the advantages of display and handwriting.

A touch electronic device is generally provided with a stylus. To prevent the stylus from being lost, the stylus is often bound to the electronic device. For example, accessories such as support apparatuses and support frames commonly used in electronic devices are provided with structures such as clamping grooves and stylus cases to fasten styluses. However, during use of these structures, the styluses are clamped too tightly, easy to fall off, or inconvenient to place and take, which affects user experience.

SUMMARY

This application provides a support apparatus and an electronic device, so as to resolve the problems that a stylus is clamped too tightly, easy to fall off and inconvenient to place and take by providing a magnetic stylus fastener and a magnet of the stylus to generate a magnetic acting force.

According to a first aspect, an embodiment of this application provides a support apparatus. The support apparatus may be configured to fasten a stylus, the stylus includes a penholder and a magnet, the penholder includes an internal accommodating space, and the magnet is mounted in the accommodating space. The magnet includes a first wall surface and a second wall surface facing away from the first wall surface, and a polarity of the first wall surface is opposite to that of the second wall surface. Specifically, the first wall surface is an N pole, and the second wall surface is an S pole; or the first wall surface is an S pole, and the second wall surface is an N pole.

The support apparatus includes a main body, a support frame, a connecting part, and a stylus fastener, the support frame is connected to the main body by using the connecting par, and the support frame may be folded or unfolded with respect to the main body. The support frame is configured to support a mobile terminal. When the support frame is folded with respect to the main body, the mobile terminal can be accommodated between the support frame and the main body to protect appearance of the mobile terminal; and the support frame can support the mobile terminal at an angle when being unfolded with respect to the main body.

The stylus fastener is disposed on the main body, the support frame, or the connecting part.

In this embodiment, the connecting part includes an accommodating groove for accommodating the stylus, and a notch of the accommodating groove faces a side of the support apparatus in an X-axis direction, so that the stylus can be easily placed and taken. The stylus fastener is mounted in the accommodating groove without occupying an extra space of the support apparatus, so as to ensure that the support apparatus has a regular appearance contour. In an embodiment, an outer wall surface includes a first plane, and a second plane is disposed on a wall of the accommodating groove. After the stylus fastener is mounted in the accommodating groove, the first plane is attached and fastened to the second plane, so that the stylus fastener is in a surface-to-surface contact with the wall of the accommodating groove to improve stability of the stylus fastener.

In other embodiments, the main body includes a housing, and the housing includes a first mounting surface and a first appearance surface that faces away from the first mounting surface. When the support frame is folded with respect to the main body, the first mounting surface faces the support frame and is in an invisible state to protect the mobile terminal located between the main body and the support frame, and the first appearance surface faces away from the support frame and is in a visible state. The stylus fastener is disposed on the first appearance surface. When the support frame is unfolded with respect to the main body, the first mounting surface is exposed to show a keyboard disposed thereon for a user to operate. The first mounting surface also supports a bottom of the mobile terminal to prevent the mobile terminal from shaking, and the first appearance surface is in contact with an object such as a desktop for the user to use the mobile terminal.

In another embodiment, the support frame includes a second mounting surface and a second appearance surface that faces away from the second mounting surface, and when the support frame is folded with respect to the main body, the second mounting surface faces the main body and is in an invisible state to protect the mobile terminal located between the main body and the support frame. The second appearance surface faces away from the second mounting surface and is in a visible state, and the stylus fastener is disposed on the second appearance surface. When the support frame is folded with respect to the main body, the second mounting surface carries the mobile terminal, so that it is easy to use the mobile terminal.

In this embodiment, the stylus fastener includes an annular body and a mounting space formed by the body, the body is magnetic and includes an inner wall surface, an outer wall surface, and two opposite peripheral wall surfaces. The inner wall surface faces the mounting space, the outer wall surface faces away from the inner wall surface, opposite sides of the inner wall surface are connected to one side of the two peripheral wall surfaces, and opposite sides of the outer wall surface are connected to the other side of the two peripheral wall surfaces. Widths of the inner wall surface and the outer wall surface in the X-axis direction are the same, and widths of the two peripheral wall surfaces in a direction perpendicular to an X axis are the same, so that the stylus fastener can be easily machined to reduce costs. The inner wall surface has a first polarity, the outer wall surface has a second polarity, and the first polarity is opposite to the second polarity.

The stylus is mounted in the mounting space in the X-axis direction, so that the stylus fastener is sleeved onto a periphery of the stylus; and both the first wall surface and the second wall surface are disposed opposite to the inner wall surface, a first magnetic force is generated between the first wall surface and the inner wall surface, a second magnetic force is generated between the second wall surface and the inner wall surface, and the first magnetic force and the second magnetic force have a difference, so that the stylus can be magnetically fastened to the stylus fastener by using the magnet.

The stylus is fastened by using the first magnetic force and the second magnetic force between the magnet and the stylus fastener. When the stylus tends to slide out of the mounting space of the stylus fastener, the first magnetic force and the second magnetic force lead to a significant shear force between the magnet and the stylus fastener, so that the stylus is not clamped too tightly to be taken out, and can be reliably fastened, thereby effectively preventing the stylus from falling off. To use the stylus, the user can take out the stylus by simply overcoming a magnetic force between the magnet and the stylus fastener; after use, the user inserts the stylus into the stylus fastener, and the magnet and the magnetic holder can be automatically adsorbed to fasten the stylus without additional operation. Therefore, it is very easy to place and take the stylus.

In an embodiment, the first magnetic force is greater than the second magnetic force, and the first magnetic force is a magnetic adsorption force. Specifically, a direction of magnetic lines of the body is from the inner wall surface to the outer wall surface, the first polarity is an S pole, the second polarity is an N pole, the first wall surface has a polarity of the N pole, and the second wall surface has a polarity of the S pole; or a direction of magnetic lines of the body is from the outer wall surface to the inner wall surface, the first polarity is an N pole, the second polarity is an S pole, the first wall surface has a polarity of the S pole, and the second wall surface has a polarity of the N pole. In this case, the first magnetic force between the inner wall surface and the first wall surface is a magnetic adsorption force. The magnetic adsorption force is greater than the second magnetic force, so that a resultant force of the first magnetic force and the second magnetic force is an adsorption force to ensure that the magnet and the stylus fastener attract each other. Therefore, the stylus can be reliably fastened through mutual attraction between the magnet and the stylus fastener.

In an embodiment, the second magnetic force is a magnetic repulsion force, and a direction of the first magnetic force is the same as that of the second magnetic force. Specifically, the first magnetic force between the inner wall surface and the first wall surface is a magnetic adsorption force, the second magnetic force between the inner wall surface and the second wall surface is a magnetic repulsion force, and a direction of the magnetic adsorption force is the same as that of the magnetic repulsion force, so that an acting force between the magnet and the stylus fastener can be strengthened. Therefore, the stylus can be fastened more reliably.

In an embodiment, magnetic lines of the body are evenly distributed in an extension direction of the body; and in a direction perpendicular to the X axis, a distance between the first wall surface and the inner wall surface is a first distance, a distance between the second wall surface and the inner wall surface is a second distance, and the first distance is less than the second distance. Specifically, the first distance is a linear distance between each point of the first wall surface and each point of a corresponding area of the inner wall surface, and the second distance is a linear distance between each point of the second wall surface and each point of a corresponding area of the inner wall surface. After the stylus is mounted in the mounting space of the stylus fastener, an axis of the accommodating space of the penholder in the X-axis direction coincides with an axis of the mounting space of the stylus fastener in the X-axis direction, the magnet is fastened to an inner wall of the accommodating space, and the first wall surface is closer to the inner wall of the accommodating space. In this case, the magnet deviates from the axis of the penholder in the X-axis direction, so that the first distance between the first wall surface and the inner wall surface is less than the second distance between the second wall surface and the inner wall surface. In this case, magnetic lines of the body are evenly distributed, and the first wall surface is closer to the inner wall surface to ensure that the first magnetic force is greater than the second magnetic force, so that the magnet and the stylus fastener can be reliably adsorbed, thereby improving fastening stability of the stylus.

In an embodiment, in a direction around the X axis, the inner wall surface includes a first area and a second area, and a density of magnetic lines of the first area is higher than that of the second area; and in the direction perpendicular to the X axis, the first wall surface is opposite to a part of the first area, and the second wall surface is opposite to a part of the second area. Specifically, after the stylus is mounted in the mounting space of the stylus fastener, the first distance between the first wall surface and the inner wall surface is less than the second distance between the second wall surface and the inner wall surface. In this case, a density of magnetic lines of an area that is of the inner wall surface and that is corresponding to the first wall surface is higher, and a distance between the inner wall surface and the first wall surface is shorter, so that a magnetic acting force between the inner wall surface and the first wall surface is stronger. Therefore, the magnetic adsorption force can be greater than the second magnetic force to ensure that a resultant force of the first magnetic force and the second magnetic force is an adsorption force.

In an embodiment, the first wall surface is opposite to a part of the first area, the second wall surface is opposite to the entire second area, and the first distance between the first wall surface and the inner wall surface is less than the second distance between the second wall surface and the inner wall surface. Therefore, a density of magnetic lines of an area that is of the inner wall surface and that is corresponding to the first wall surface is higher, and a distance between the inner wall surface and the first wall surface is shorter, so as to ensure that a magnetic adsorption force between the inner wall surface and the first wall surface is stronger.

In an embodiment, the first wall surface is opposite to the entire first area, the second wall surface is opposite to a part of the second area, and the first distance between the first wall surface and the inner wall surface is less than the second distance between the second wall surface and the inner wall surface. Therefore, a density of magnetic lines of an area that is of the inner wall surface and that is corresponding to the first wall surface is higher, and a distance between the inner wall surface and the first wall surface is shorter, so as to ensure that a magnetic adsorption force between the inner wall surface and the first wall surface is stronger.

In an embodiment, in a direction perpendicular to the X axis, a density of magnetic lines of an area that is of the inner wall surface and that is opposite to the first wall surface is higher than that of an area that is of the inner wall surface and that is opposite to the second wall surface. Specifically, after the stylus is mounted in the mounting space of the stylus fastener, an axis of the accommodating space of the penholder in the X-axis direction coincides with an axis of the mounting space of the stylus fastener in the X-axis direction, and magnets are fastened in the middle of the accommodating space in the X-axis direction. In this case, the magnets are symmetrically disposed along an axis of the penholder in the X-axis direction. Therefore, in the direction perpendicular to the X axis, the first distance between the first wall surface and the inner wall surface is the same as the second distance between the second wall surface and the inner wall surface. In this case, the distance between the first wall surface and the inner wall surface is the same as the distance between the second wall surface and the inner wall surface, and a density of magnetic lines of an area that is of the inner wall surface and that is corresponding to the first wall surface is higher. Therefore, a magnetic acting force between the inner wall surface and the first wall surface is stronger to ensure that a resultant force of the first magnetic force and the second magnetic force is an adsorption force.

In an embodiment, the second magnetic force is greater than the first magnetic force, and the second magnetic force is a magnetic adsorption force. Specifically, a direction of magnetic lines of the body is from the inner wall surface to the outer wall surface, the first polarity is an S pole, the second polarity is an N pole, the first wall surface has a polarity of the S pole, and the second wall surface has a polarity of the N pole; or a direction of magnetic lines of the body is from the outer wall surface to the inner wall surface, the first polarity is an N pole, the second polarity is an S pole, the first wall surface has a polarity of the N pole, and the second wall surface has a polarity of the S pole. In this case, the second magnetic force between the inner wall surface and the second wall surface is a magnetic adsorption force. The magnetic adsorption force is greater than the first magnetic force, so that a resultant force of the first magnetic force and the second magnetic force is an adsorption force to ensure that the magnet and the stylus fastener attract each other. Therefore, the stylus can be reliably fastened through mutual attraction between the magnet and the stylus fastener.

In an embodiment, the first magnetic force is a magnetic repulsion force, and a direction of the magnetic adsorption force is the same as that of the magnetic repulsion force. Specifically, the first magnetic force between the inner wall surface and the first wall surface is a magnetic repulsion force, the second magnetic force between the inner wall surface and the second wall surface is a magnetic adsorption force, and a direction of the magnetic adsorption force is the same as that of the magnetic repulsion force, so that an acting force between the magnet and the stylus fastener can be strengthened. Therefore, the stylus can be fastened more reliably.

In an embodiment, magnetic lines of the body are evenly distributed in an extension direction of the body; and in a direction perpendicular to the X axis, a distance between the first wall surface and the inner wall surface is a first distance, a distance between the second wall surface and the inner wall surface is a second distance, and the first distance is greater than the second distance. After the stylus is mounted in the mounting space of the stylus fastener, an axis of the accommodating space of the penholder in the X-axis direction coincides with an axis of the mounting space of the stylus fastener in the X-axis direction, the magnet is fastened to an inner wall of the accommodating space, and the second wall surface is closer to the inner wall of the accommodating space. In this case, the magnet deviates from the axis of the penholder in the X-axis direction, so that the first distance between the first wall surface and the inner wall surface is greater than the second distance between the second wall surface and the inner wall surface. In this case, magnetic lines of the body are evenly distributed, and the second wall surface is closer to the inner wall surface to ensure that the magnetic adsorption force is greater than the first magnetic force, so that the magnet and the stylus fastener can be reliably adsorbed, thereby improving fastening stability of the stylus.

In an embodiment, in a direction perpendicular to the X axis and in a direction around the X axis, the inner wall surface includes a first area and a second area, and a density of magnetic lines of the first area is lower than that of the second area; and the first wall surface is opposite to a part of the first area, and the second wall surface is opposite to a part of the second area. Specifically, after the stylus is mounted in the mounting space of the stylus fastener, a distance between the first wall surface and the inner wall surface is a first distance, a distance between the second wall surface and the inner wall surface is a second distance, and the first distance is greater than or equal to the second distance. In this case, a distance between the inner wall surface and the first wall surface is greater than or equal to a distance between the inner wall surface and the second wall surface, and a density of magnetic lines of an area that is of the inner wall surface and that is corresponding to the first wall surface is higher, so that a magnetic acting force between the inner wall surface and the first wall surface is stronger. Therefore, the magnetic adsorption force can be greater than the second magnetic force to ensure that a resultant force of the first magnetic force and the second magnetic force is an adsorption force.

In an embodiment, the first wall surface is opposite to the entire first area, the second wall surface is opposite to a part of the second area, and the first distance between the first wall surface and the inner wall surface is greater than or equal to the second distance between the second wall surface and the inner wall surface. Therefore, a density of magnetic lines of an area that is of the inner wall surface and that is corresponding to the second wall surface is higher, and a distance between the inner wall surface and the second wall surface is shorter, so as to ensure that a magnetic adsorption force between the inner wall surface and the second wall surface is stronger.

In an embodiment, the first wall surface is opposite to apart of the first area, the second wall surface is opposite to the entire second area, and the first distance between the first wall surface and the inner wall surface is greater than or equal to the second distance between the second wall surface and the inner wall surface. Therefore, a density of magnetic lines of an area that is of the inner wall surface and that is corresponding to the second wall surface is higher, and a distance between the inner wall surface and the second wall surface is shorter, so as to ensure that a magnetic adsorption force between the inner wall surface and the second wall surface is stronger.

In an embodiment, widths of the first wall surface, the second wall surface, and the inner wall surface are the same in the X-axis direction. Specifically, because a difference in widths of the magnet and the stylus fastener in the X-axis direction affects a position where the stylus is inserted, the larger the difference in dimensions of the magnet and the stylus fastener, the position of the stylus may change each time the stylus is inserted. Therefore, if the first wall surface, the second wall surface, and the inner wall surface are disposed to have the same dimension in the X-axis direction, the magnet and the stylus fastener are aligned in the X-axis direction when the stylus is mounted in the mounting space in the X-axis direction. Then, each time the stylus is inserted into the stylus fastener after use, the position of the stylus is basically fixed to prevent a tip or a protective cap of the stylus from extending out of the support apparatus.

In an embodiment, the stylus fastener includes a plurality of magnets, and the plurality of magnets are disposed around the X axis to enclose into an annular shape. "A plurality of" means two or more. When the stylus fastener is equally divided into a plurality of magnets for machining, a bending degree of each magnet is small to reduce magnetization difficulty and costs.

In an embodiment, lengths of the plurality of magnets are the same in a direction around the X axis. Therefore, a plurality of magnets can be machined in batches to reduce machining difficulty and costs.

In an embodiment, the stylus fastener is integrally formed into an annular stylus fastener, magnetic induction lines of the integrally formed stylus fastener are evenly distributed, and a stress on the stylus is relatively uniform and stable, so that fastening stability of the stylus can be improved.

In an embodiment, a quantity of the stylus fasteners is more than one, the plurality of stylus fasteners are equally spaced in the X-axis direction, and mounting spaces of the plurality of stylus fasteners are coaxially disposed. Specifically, a plurality of magnets are disposed in the accommodating space of the penholder. Therefore, correspondingly, a plurality of stylus fasteners are disposed, the plurality of stylus fasteners are equally spaced in the X-axis direction, and mounting spaces of the plurality of stylus fasteners are coaxially disposed, where "a plurality of" means two or more. When the stylus is mounted, the stylus sequentially runs through the plurality of stylus fasteners. In this case, the plurality of magnets are in a one-to-one correspondence with the plurality of stylus fasteners, and a magnetic acting force is generated between each set of magnets and stylus fasteners, so that fastening reliability of the stylus can be improved. The plurality of stylus fasteners are equally spaced, so that a stress on the stylus is relatively uniform, and stability is higher.

In an embodiment, a plurality of magnets are disposed in the accommodating space of the penholder, and the plurality of magnets are randomly arranged in the X-axis direction of the accommodating space. Therefore, correspondingly, a plurality of stylus fasteners are randomly arranged in the X-axis direction. Specifically, a spacing between magnets located in the middle of the accommodating groove in the X-axis direction is less than a spacing between magnets located at ends. Because the stylus is long, the magnets in the middle of the accommodating groove are densely distributed, so that fastening strength in the middle of the stylus may be improved, and the entire stylus can be reliably fastened.

In an embodiment, a quantity of the stylus fasteners is one, the one stylus fastener is fastened in the middle of the accommodating groove, and the middle of the accommodating groove means any position between two ends of the accommodating groove, so as to reduce costs, reduce a weight of the support apparatus, and reduce a burden of a user to carry the electronic device provided with the support apparatus. In other embodiments, the stylus fastener is fastened at either end of the accommodating groove.

In an embodiment, the stylus fastener has a circular annular shape, a square annular shape, an elliptical annular shape, or a triangular annular shape, which may be matched with a circular stylus, a square stylus, an elliptical stylus, or a triangular stylus, respectively, so as to improve applicability matching of the stylus fastener.

In an embodiment, the stylus fastener is a closed annular stylus fastener, so that when the stylus is inserted into the stylus fastener at any angle, the first wall surface and the second wall surface of the magnet may be opposite to the inner wall surface, and the first magnetic force between the first wall surface and the inner wall surface is relatively stable, which can improve convenience of fastening the stylus.

In an embodiment, the stylus fastener is annular with an opening, so that a weight of the stylus fastener may be reduced, thereby reducing a weight of the entire support apparatus, and reducing a burden of a user to carry the electronic device provided with the support apparatus.

The support apparatus according to an embodiment of this application includes a stylus fastener, the stylus fastener and a magnet in the stylus generate a first magnetic force and a second magnetic force, and a resultant force of the first magnetic force and the second magnetic force can reliably fasten the stylus, which can not only prevent the stylus from being clamped too tightly, but also prevent the stylus from falling off. To use the stylus, the stylus can be taken out by overcoming a magnetic acting force between the magnet and the stylus fastener; and after use, the user inserts the stylus into the stylus fastener, and the magnet and the stylus fastener are automatically adsorbed to fasten the stylus. Therefore, it is easy to place and take the stylus.

According to a second aspect, an embodiment of this application provides an electronic device, including: a mobile terminal, a stylus, and a support apparatus according to any one of the embodiments of the first aspect of this application. The mobile terminal is mounted on the support frame of the support apparatus, the stylus is mounted at the connecting part and runs through the mounting space of the stylus fastener, the stylus is fastened by using a magnetic acting force between the magnet and the stylus fastener, the mobile terminal is accommodated between the support frame and the main body when the support frame is folded with respect to the main body, and the support frame and the main body are configured to protect appearance of the mobile terminal from being damaged. The support frame supports the mobile terminal when being unfolded with respect to the main body, and in this case, the support frame is folded into a support state, a back of the mobile terminal is supported by the support frame, and a bottom of the mobile terminal is supported by the main body, so that a user can use the stylus easily.

In this embodiment, the stylus includes a penholder, the penholder is provided with an accommodating space, and a magnet is mounted in the accommodating space and is fastened to an inner wall of the accommodating space. In this case, an axis of the penholder in a length direction coincides with a central axis of the stylus fastener, and the magnet deviates from the axis, so that a distance between the first wall surface and the inner wall surface is greater than a distance between the second wall surface and the inner wall surface. Therefore, a magnetic adsorption force can be ensured to be greater than a magnetic repulsion force, so that the stylus can be reliably fastened.

In another embodiment, the stylus includes a penholder, the penholder is provided with an accommodating space, magnets are mounted in the accommodating space and are located in the middle of the accommodating space, the magnets are symmetrically disposed along an axis, and the first wall surface and the second wall surface are located on two sides of the axis. In this case, a density of magnetic lines of an area that is of the inner wall surface and that is corresponding to the first wall surface is higher than that of an area that is of the inner wall surface and that is corresponding to the second wall surface, so that a magnetic adsorption force is greater than a magnetic repulsion force to ensure that the stylus can be well fastened.

The stylus of the electronic device according to this embodiment of this application is fastened by using the magnetic acting force between the magnet and the stylus fastener. The stylus is not clamped too tightly, and fastening reliability is high, so that the stylus will not easily fall off from the electronic device. To use the stylus, the stylus can be taken out by overcoming a magnetic acting force between the magnet and the stylus fastener; and after use, the user inserts the stylus into the stylus fastener, and the magnet and the stylus fastener are automatically adsorbed to fasten the stylus. Therefore, it is easy to place and take the stylus.

BRIEF DESCRIPTION OF DRAWINGS

To describe technical solutions in embodiments or the background of this application more clearly, the following describes accompanying drawings required in embodiments or the background of this application.

DESCRIPTION OF EMBODIMENTS

Embodiments of this application are described below with reference to accompanying drawings in embodiments of this application.

Figure 1:
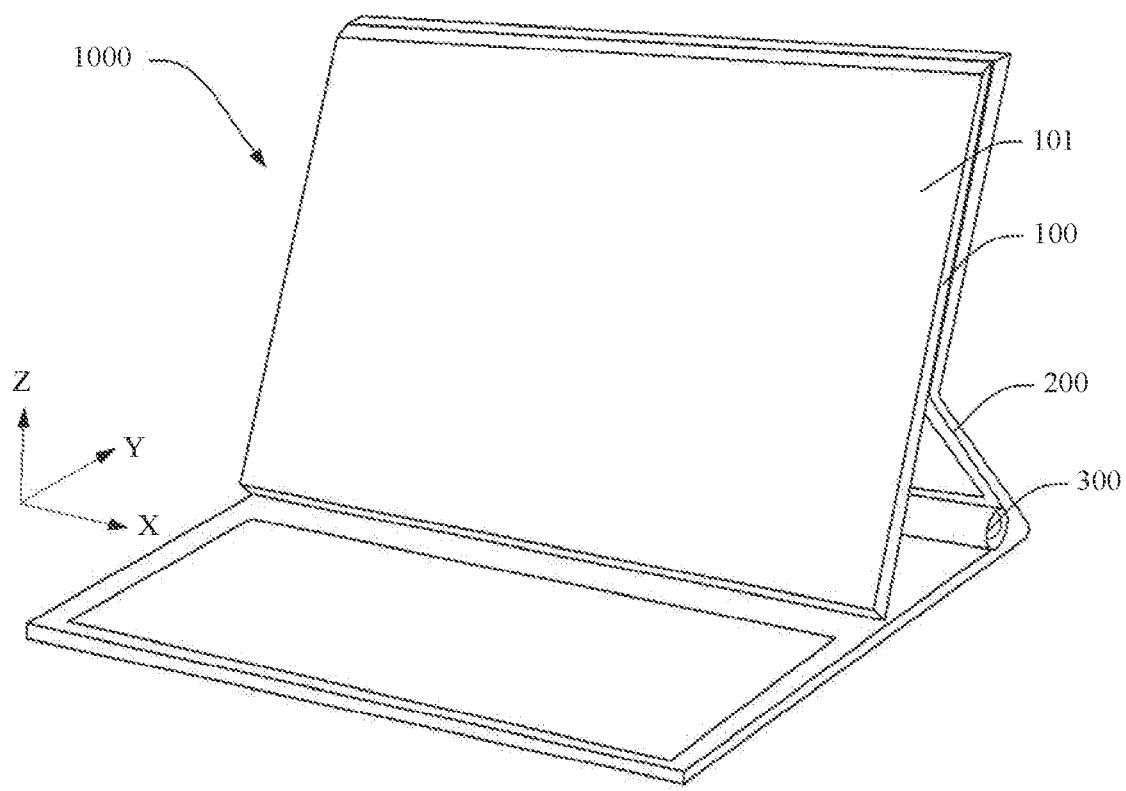
FIG. 1 is a schematic diagram of a structure of an electronic device according to an embodiment of this application in a state.
Figure 2:
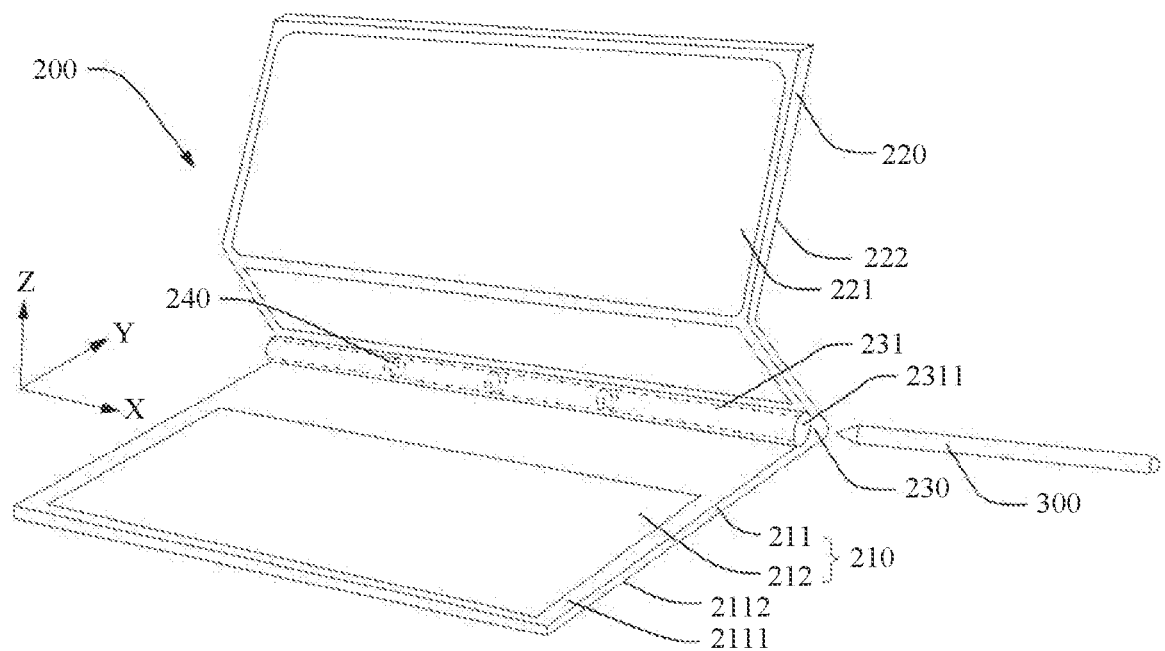
FIG. 2 is a schematic diagram of a structure of a support apparatus of the electronic device shown in FIG. 1.

Referring to FIG. 1 and FIG. 2, FIG. 1 is a schematic diagram of a structure of an electronic device 1000 according to an embodiment of this application in a state; and FIG. 2 is a schematic diagram of a structure of a support apparatus of the electronic device 1000 shown in FIG. 1. The electronic device 1000 shown in FIG. 1 is in an unfolded and active state.

For ease of description, a length direction of the electronic device 1000 is defined as an X-axis direction, a width direction of the electronic device 1000 is defined as a Y-axis direction, and a thickness direction of the electronic device 1000 is defined as a Z-axis direction. The X-axis direction, the Y-axis direction, and the Z-axis direction are perpendicular to each other.

Surface magnetism: a magnetic induction intensity at a point on a surface of a stylus fastener.

The electronic device 1000 includes a mobile terminal 100, a support apparatus 200, and a stylus 300, and the mobile terminal 100 is detachably mounted on the support apparatus 200. The mobile terminal 100 may be an electronic product with a touch panel, such as a mobile phone, a tablet computer, a personal digital assistant (personal digital assistant, PDA), an interactive electronic whiteboard, and a learning machine. In this embodiment of this application, that the mobile terminal 100 is a tablet computer and the support apparatus 200 is a tablet computer protection bracket is used as an example for description, and the tablet computer in this embodiment is equipped with a stylus 300. The stylus 300 may be an inductive stylus or a capacitance stylus. The mobile terminal 100 has a display surface 101, and the display surface 101 is used to display information such as pictures and text, and is operated by touch with the stylus 300. When the electronic device 1000 is in an unfolded state, the display surface 101 is exposed with respect to the support apparatus 200, so that a user can easily operate and view information displayed on the display surface 101.

Still referring to FIG. 2, the support apparatus 200 includes a main body 210, a support frame 220, a connecting part 230, and a stylus fastener 240. A length direction, a width direction, and a thickness direction of the support apparatus 200 are the same as those of the electronic device 1000, respectively. Specifically, the length direction of the support apparatus 200 is an X-axis direction shown in the figure, the width direction of the support apparatus 200 is a Y-axis direction shown in the figure, and the thickness direction of the support apparatus 200 is a Z-axis direction shown in the figure. The support frame 220 is connected to the main body 210 by using the connecting part 230, and may be folded or unfolded with respect to the main body 210. The support frame 220 is configured to accommodate and/or support the mobile terminal 100. When the support frame 220 is folded with respect to the main body 210, the mobile terminal 100 may be accommodated between the main body 210 and the support frame 220 to protect appearance of the mobile terminal 100. The support frame 220 can support the mobile terminal 100 at an angle when being bent and unfolded with respect to the main body 210. The stylus fastener 240 is configured to carry and fasten the stylus 300; and the stylus fastener 240 is disposed on the main body 210, the support frame 220, or the connecting part 230.

In this embodiment, the main body 210 includes a housing 211, an electronic component, and a keyboard 212. The electronic component is mounted inside the housing. The electronic component may be a circuit board or a processor. The keyboard 212 is mounted on the housing, and the keyboard 212 is exposed with respect to the housing 211 for a user to operate the keyboard. Specifically, the keyboard is electrically connected to the electronic component, the user may operate the keyboard 212 to generate an operation signal, and the electronic component may process the operation signal. For example, the keyboard 212 and the tablet computer are electrically connected by using the electronic component for signal transmission. The tablet computer and the electronic component are connected in a wireless or wired manner for communication.

In this embodiment, the housing 211 includes a first mounting surface 2111 and a first appearance surface 2112. When the support frame 220 is folded with respect to the main body 210, the first mounting surface 2111 is attached to the support frame 220, and the first mounting surface 2111 is configured to carry the electronic component and the keyboard 212. The first appearance surface 2112 is exposed and is in a visible state. When the support frame 220 is unfolded with respect to the main body 210, the first mounting surface 2111 is visible, and the keyboard carried by the first mounting surface 2111 is exposed for the user to operate. The first appearance surface 2112 is in contact with an object on which the electronic device 1000 can be placed, such as a desktop, is in an invisible state, and plays a role in supporting the electronic device 1000.

The support frame 220 is configured to support the mobile terminal 100. The support frame 220 includes a second mounting surface 221 and a second appearance surface 222. When the support frame 220 is folded with respect to the main body 210, the second mounting surface 221 is attached to the main body 210, the second appearance surface 222 is exposed and is in a visible state, and the second mounting surface 221 is configured to carry the mobile terminal 100. When the support frame 220 is unfolded with respect to the main body 210, the support frame 220 may be folded into a support state. Specifically, the support frame 220 is bent in a direction towards the second appearance surface 222, so that the support frame 220 has a vertically placed V-shaped structure. A back of the mobile terminal 100 is supported by the second mounting surface 221, and a bottom thereof is supported on the first mounting surface 2111 of the housing 211 of the main body 210, that is, the support apparatus 200 supports the mobile terminal 100 at an angle. In this case, the second appearance surface 222 faces away from the display surface 101. In this embodiment, the support frame 220 is formed by wrapping a hard plate with a flexible outer surface layer, and the support frame 220 is bent through a gap between the hard plate when bending. The mobile terminal 100 is accommodated between the main body 210 and the support frame 220, and the support apparatus 200 and the mobile terminal 100 may be fastened by using an external buckle or a binding rope. In other embodiments, a periphery or four corners of the second mounting surface 221 are provided with a wrapping to wrap a periphery of the mobile terminal 100, so as to fasten the mobile terminal 100 and protect the periphery of the mobile terminal 100.

The connecting part 230 of this embodiment is made of a flexible material, and is connected between the main body 210 and the support frame 220. It may be understood that the connecting part 230 is a rotating structure between the main body 210 and the support frame 220 to implement free rotation of the support frame 220 with respect to the main body 210. The connecting part 230 includes an accommodating groove 231 for accommodating the stylus 300 and the stylus fastener, and a notch 2311 of the accommodating groove 231 faces a side of the support apparatus 200 in the X-axis direction, so that the stylus 300 can be easily placed and taken. In other embodiments, the connecting part 230 is a rotating shaft structure to implement connection and relative rotation between the main body 210 and the support frame 220. The stylus fastener may be disposed on the support frame 220 or the main body 210.

The stylus fastener 240 is mounted in the accommodating groove 231 of the connecting part 230 without occupying an extra space of the support apparatus 200, so as to ensure that the support apparatus 200 has a regular appearance contour. In other embodiments, the stylus fastener 240 is disposed on a side of the main body 210 or on the first appearance surface 2112, or is disposed on a side of the support frame 220 or on the second appearance surface 222 for easy placement and taking.

Figure 3:
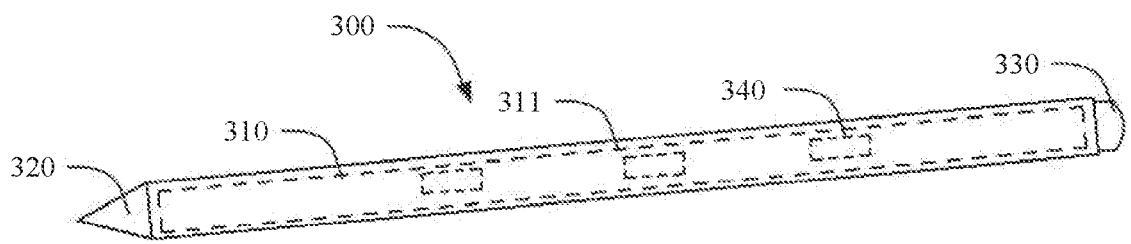
FIG. 3 is a schematic diagram of a structure of a stylus of an electronic device according to an embodiment of this application.

FIG. 3 is a schematic diagram of a structure of a stylus 300 of an electronic device 1000 according to an embodiment of this application. The stylus 300 includes a penholder 310, a stylus tip 320, a protective cap 330, and a magnet 340. The stylus tip 320 and the protective cap 330 are respectively located at two ends of the penholder 310, and the protective cap 330 is detachably and fixedly connected to the penholder 310.

In this embodiment, the penholder 310 includes an internal accommodating space 311, the accommodating space 311 is provided with an opening at an end of the penholder 310, and the protective cap 330 is covered on the opening to seal the accommodating space 311. The accommodating space 311 is configured to mount components of the stylus 300, such as a battery, a circuit board, a communication module, and a magnet 340. When the protective cap 330 is removed from the penholder 310, a battery can be replaced, circuit maintenance can be performed, and the like. The battery supplies power to the stylus 300, and the battery may be a small battery. The communication module facilitates communication between the stylus 300 and the electronic device 1000, and the communication module may be a short distance communication network such as a Wi-Fi module, a Bluetooth module, and a near field communication (near field communication, NFC) module. The communication module is disposed on the circuit board, and the battery is electrically connected to the circuit board. Generally, the penholder 310 may be cylindrical, elliptic cylindrical, cuboid-shaped, triangular prism-shaped, and hexagonal prism-shaped, and correspondingly, a cross-sectional shape of the penholder 310 is circular, elliptical, rectangular, square, triangular, and hexagonal, which is not limited herein in this application.

Figure 4:
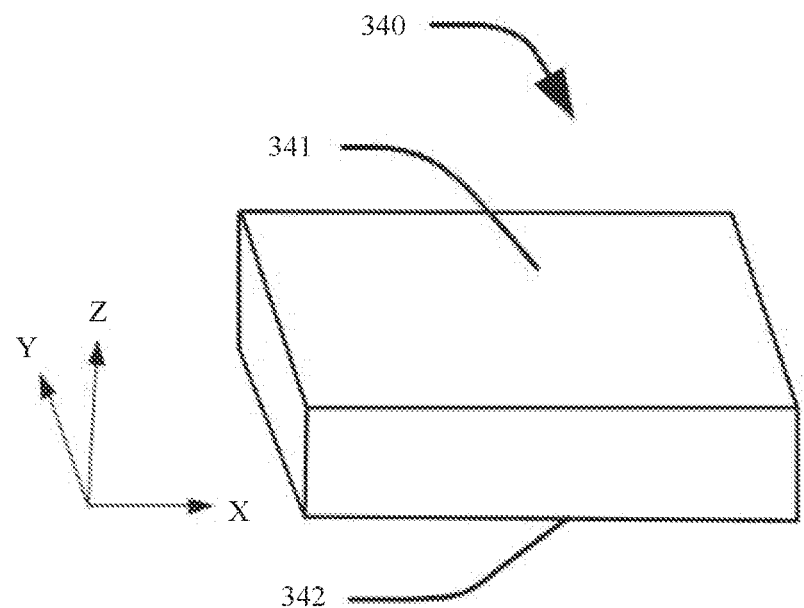
FIG. 4 is a schematic diagram of a structure of a magnet of the stylus shown in FIG. 3.

FIG. 4 is a schematic diagram of a structure of a magnet 340 of the stylus 300 shown in FIG. 3. The magnet 340 has a rectangular plate structure with a specific thickness, and the thickness may be set based on a size of the accommodating space 311 of the penholder 310. The magnet 340 includes a first wall surface 341 and a second wall surface 342 that are oppositely disposed in a Z-axis direction. A polarity of the first wall surface 341 is opposite to that of the second wall surface 342. Specifically, one of the first wall surface 341 and the second wall surface 342 is an N pole and the other is an S pole. In other embodiments, the first wall surface 341 and the second wall surface 342 are oppositely disposed in the Y-axis direction. In this embodiment, "first" and "second" in the first wall surface 341 and the second wall surface 342 are used for descriptive purposes, but are not intended to limit this embodiment. In other embodiments, the first wall surface 341 may also be referred to as the second wall surface 342, and the second wall surface 342 may also be referred to as the first wall surface 341.

In this embodiment, the magnet 340 is mounted in the accommodating space 311 of the penholder 310 of the stylus 300, and the magnet 340 is fastened to an inner wall of the accommodating space 311. In this case, the magnet 340 deviates from an axis in the X-axis direction. In other embodiments, magnets 340 are mounted in the penholder of the stylus 300 and are located in the middle of the accommodating space 311 in the X-axis direction. In this case, a central axis of the magnets 340 in the X-axis direction coincides with an axis of the accommodating space 311 of the penholder 310 in the X-axis direction, and the magnets 340 are symmetrically disposed along an X-axis direction of the accommodating space 311, that is, the first wall surface 341 and the second wall surface 342 may be symmetrical with the axis of the accommodating space 311 in the X-axis direction.

Figure 5:
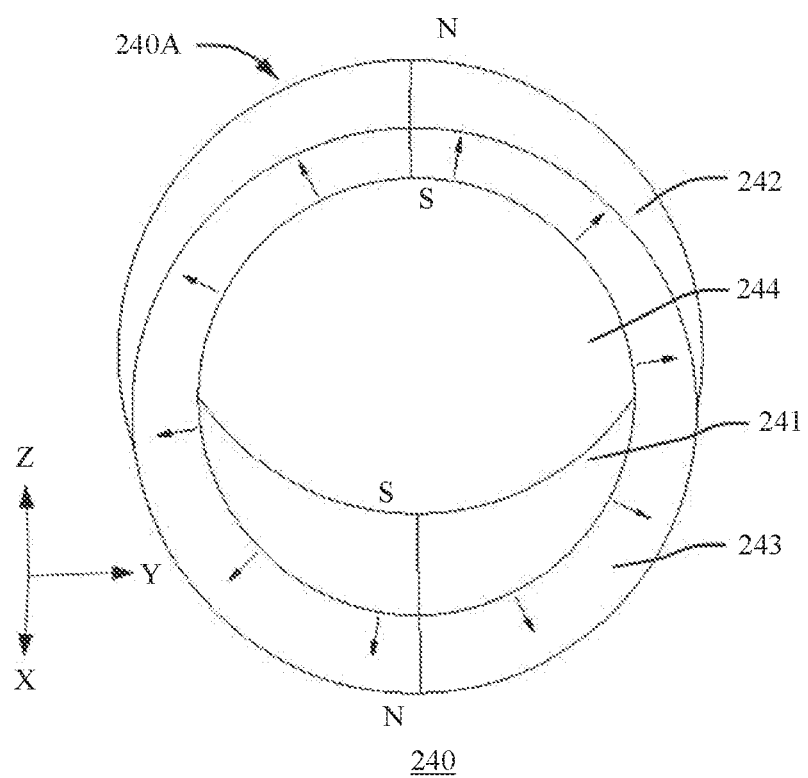
FIG. 5 is a structural diagram of a stylus fastener of the support apparatus shown in FIG. 2.

FIG. 5 is a structural diagram of a stylus fastener of the support apparatus 200 shown in FIG. 2. In this embodiment, the stylus fastener 240 includes an annular body 240A and a mounting space 244 formed by the body 240A. Specifically, the body 240A is of a circular annular structure, and at least one stylus fastener 240 is provided and is mounted in the accommodating groove 231. A center line of the annular body 240A coincides with a center line in a length direction of the accommodating groove 231, so as to ensure a mounting accuracy. Therefore, the stylus 300 can be accurately inserted into the mounting space 244 of the stylus fastener 240 after being mounted in the accommodating groove 231. Specifically, the body 240A is magnetic and includes an inner wall surface 241, an outer wall surface 242, and two opposite peripheral wall surfaces 243. The inner wall surface 241 is an annular surface that surrounds and faces the mounting space 244, and the outer wall surface 242 is disposed away from the inner wall surface 241. Opposite sides of the inner wall surface 241 are connected to one side of the two peripheral wall surfaces 243, and opposite sides of the outer wall surface 242 are connected to the other side of the two peripheral wall surfaces 243. The inner wall surface 241 has a first polarity, the outer wall surface 242 has a second polarity, and the first polarity is opposite to the second polarity. The first polarity is an S pole, the second polarity is an N pole, or the second polarity is an S pole, and the first polarity is an N pole. The mounting space 244 is used for insertion of the stylus 300, and the stylus fastener 240 and the stylus 300 are fastened through magnetic adsorption. An axial direction of the stylus fastener 240 is an X-axis direction shown in FIG. 5. The X-axis direction, a Y-axis direction, and a Z-axis direction in FIG. 5 are the same as those shown in FIG. 1. The body 240A in this embodiment includes two parts 2401 and 2402 that are connected for magnetizing the stylus fastener 240 during manufacturing.

In this embodiment, the stylus fastener 240 is a closed annular stylus fastener, so that when the stylus 300 is inserted into the stylus fastener 240 at any angle, the first wall surface 341 and the second wall surface 342 of the magnet 340 may be opposite to the inner wall surface 241, and a magnetic acting force between the first wall surface 341 and the inner wall surface 241 is relatively stable, which can improve convenience of fastening the stylus 300. In other embodiments, the stylus fastener 240 is annular with an opening, so that a weight of the stylus fastener 240 may be reduced, thereby reducing a weight of the entire support apparatus 200, and reducing a burden of a user to carry the electronic device 1000 provided with the support apparatus 200.

Figure 6:
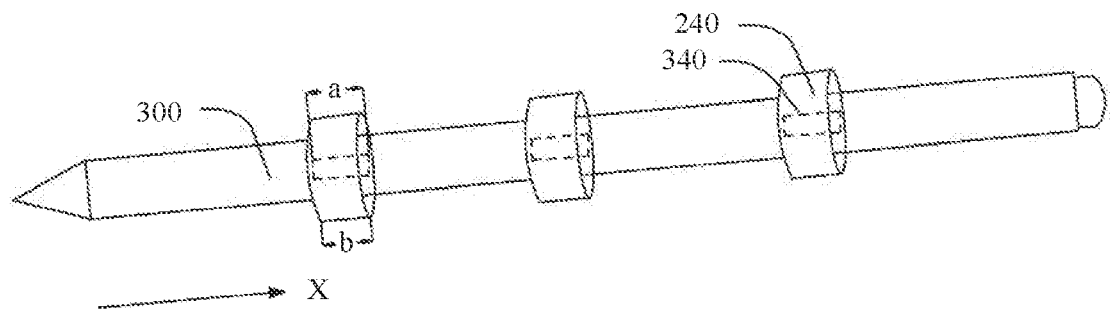
FIG. 6 is a schematic diagram showing a state in which a stylus is mounted in a stylus fastener.
Figure 7:
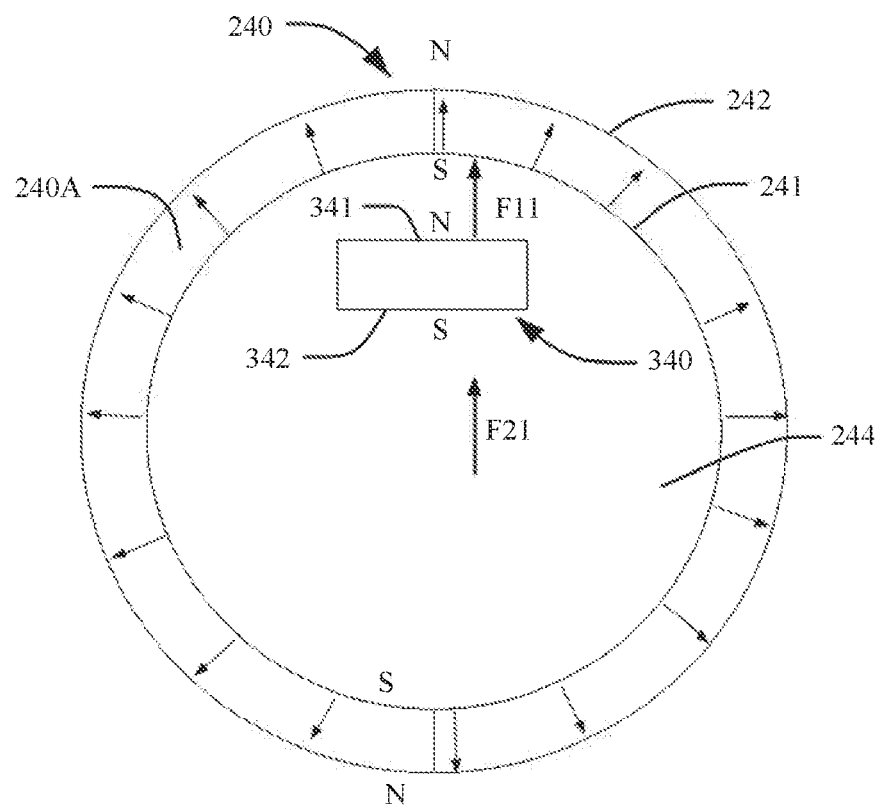
FIG. 7 is a schematic diagram showing a direction of a magnetic acting force between a magnet and a stylus fastener.

In this embodiment, referring to FIG. 6 and FIG. 7, FIG. 6 is a schematic diagram showing a state in which a stylus 300 is mounted in a stylus fastener 240, and FIG. 7 is a schematic diagram showing a direction of a magnetic acting force between a magnet 340 and a stylus fastener 240. When the stylus 300 is mounted in the mounting space 244 of the stylus fastener 240 in the X-axis direction so that the stylus fastener 240 is sleeved onto a periphery of the stylus 300, the first wall surface 341 and the second wall surface 342 are disposed opposite to the inner wall surface 241, a first magnetic force is generated between the first wall surface 341 and the inner wall surface 241, and the first magnetic force and the second magnetic force have a difference, so that the stylus 300 can be magnetically fastened to the stylus fastener by using the magnet 340.

The inner wall surface 241 of the stylus fastener 240 in this application has a first polarity, the outer wall surface 242 has a second polarity, and the first polarity is opposite to the second polarity. It may be understood that magnetic lines of the annular stylus fastener 240 are radially arranged; and the first magnetic force and the second magnetic force have a difference, so that the stylus 300 is magnetically fastened to the stylus fastener by using the magnet 340. The stylus fastener 240 is magnetic, and magnetic lines are radially arranged. Compared with a conventional manner of fastening a stylus 300 by using an iron ring and a magnet 340, a magnetic acting force between the stylus fastener 240 and the magnet 340 is significantly increased. A shear force generated when the magnet 340 and the stylus fastener move away from each other in the X-axis direction is affected by a magnetic acting force therebetween; A stronger magnetic acting force indicates a stronger shear force, and a weaker magnetic acting force indicates a weaker shear force. Therefore, when the magnetic acting force is significantly increased, the shear force is also greatly increased. Specifically, when the stylus 300 tends to slide out of the mounting space 244 of the stylus fastener 240, the magnet 340 and the stylus fastener tend to move away from each other in the X-axis direction. Because of a magnetic acting force therebetween, the magnet 340 and the stylus fastener tend to move close to each other due to the magnetic acting force, and in this case, a shear force is generated to prevent the stylus 300 from sliding out in the X-axis direction. Because the magnetic acting force is strong, the shear force is correspondingly strengthened, so that the stylus 300 is not clamped too tightly to be taken out, and can be reliably fastened, thereby effectively preventing the stylus 300 from falling off. Compared with a magnet 340 with annularly arranged magnetic lines in the conventional technology, a magnetic fastening force is strengthened. To use the stylus 300, the user can take out the stylus 300 by simply overcoming a magnetic acting force; and after use, the user inserts the stylus 300 into the stylus fastener 240, and the magnet 340 and the magnetic holder can be automatically adsorbed to fasten the stylus 300 without additional operation. Therefore, it is very easy to place and take the stylus.

In an embodiment, the first magnetic force is greater than the second magnetic force, and the first magnetic force is a magnetic adsorption force. In another embodiment, the second magnetic force is greater than the first magnetic force, and the second magnetic force is a magnetic adsorption force. When the first magnetic force is greater than the second magnetic force, the first magnetic force is a magnetic adsorption force, the second magnetic force is a magnetic repulsion force, and a direction of the magnetic repulsion force is the same as that of the first magnetic force, the stylus 300 may be pushed close to a direction of the adsorption force, so as to further improve a fastening effect of the stylus 300. If the magnetic adsorption force is greater than the magnetic repulsion force, a situation in which the magnet 340 and the stylus fastener 240 repel each other due to an excessive magnetic repulsion force may be prevented, so as to avoid affecting fastening of the stylus 300.

Still referring to FIG. 7, in this embodiment, the first magnetic force is greater than the second magnetic force, and the first magnetic force is a magnetic adsorption force. A direction of magnetic lines of the body 240A is from the inner wall surface 241 to the outer wall surface 242, and the magnetic lines of the body 240A are evenly distributed in the X-axis direction. The first polarity is an S pole, the second polarity is an N pole, the first wall surface 341 has a polarity of the N pole, and the second wall surface 342 has a polarity of the S pole. In this case, the inner wall surface 241 and the first wall surface 341 generate a magnetic adsorption force F11, and the inner wall surface 241 and the second wall surface 342 generate a magnetic repulsion force F21. A force generated by the magnetic adsorption force F11 on the stylus 300 and a force generated by the magnetic repulsion force F21 on the stylus 300 have the same direction, and both are radially outward along the stylus fastener 240. Therefore, a magnetic acting force F01 between the magnet 340 and the stylus fastener 240 is equal to F11+F21, and the magnetic acting force F01 is radially outward along the stylus fastener 240, so that a fastening force on the stylus 300 from the stylus fastener is strengthened, thereby further improving the fastening stability.

Figure 8:
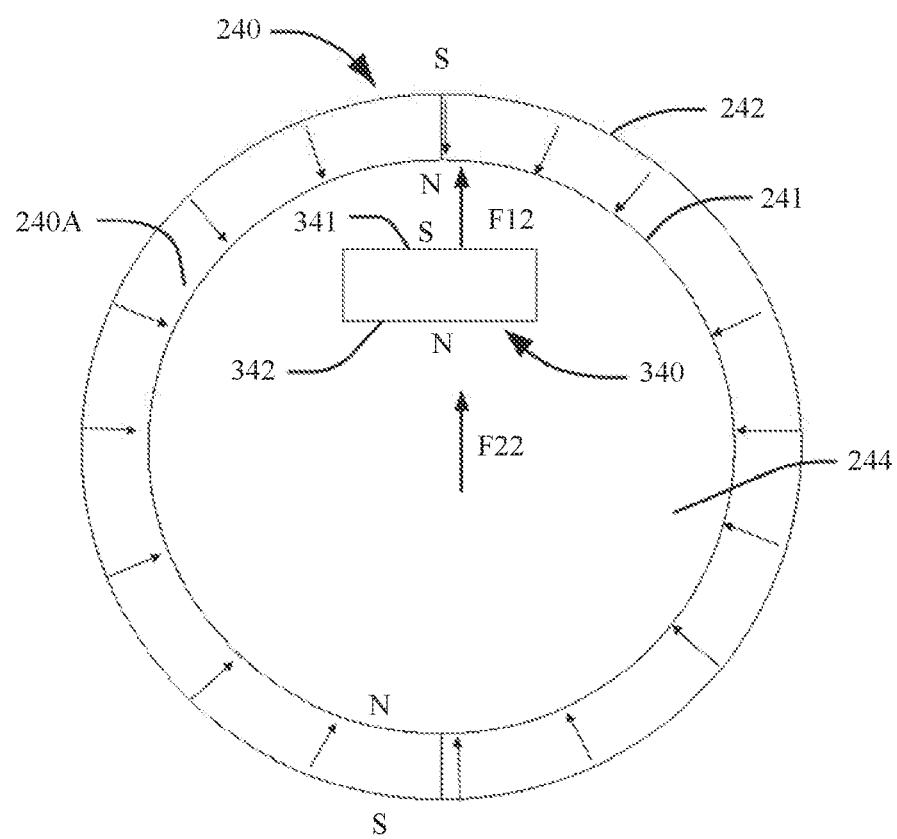
FIG. 8 is a schematic diagram showing a direction of a magnetic acting force between another magnet and a stylus fastener.

In another implementation of this embodiment, referring to FIG. 8, FIG. 8 is a schematic diagram showing a direction of a magnetic acting force between another magnet 340 and a stylus fastener 240. A direction of magnetic lines of the body 240A is from the outer wall surface 242 to the inner wall surface 241, the first polarity is an N pole, the second polarity is an S pole, the first wall surface 341 has a polarity of the S pole, and the second wall surface 342 has a polarity of the N pole. In this case, the inner wall surface 241 and the first wall surface 341 generate a magnetic adsorption force F12, and the inner wall surface 241 and the second wall surface 342 generate a magnetic repulsion force F22. A force generated by the magnetic adsorption force F12 on the stylus 300 and a force generated by the magnetic repulsion force F22 on the stylus 300 have the same direction, and both are radially outward along the stylus fastener 240. Therefore, a magnetic acting force F02 between the magnet 340 and the stylus fastener 240 is equal to F12+F22, and the magnetic acting force F02 is radially outward along the stylus fastener 240, so that a fastening force on the stylus 300 from the stylus fastener is strengthened, thereby improving fastening stability of the stylus 300.

In this embodiment, the magnet 340 is fastened to an inner wall of the accommodating space 311, and the magnet 340 deviates from an axis of the penholder in the X-axis direction. After the stylus 300 is mounted in the mounting space 244 of the stylus fastener 240, an axis of the accommodating space 311 of the penholder in the X-axis direction coincides with an axis of the mounting space 244 of the stylus fastener 240 in the X-axis direction. After the stylus 300 is mounted in the mounting space 244 of the stylus fastener 240, in a direction perpendicular to the X axis, a distance between the first wall surface 341 of the magnet 340 and the inner wall surface 241 of the stylus fastener 240 is a first distance, and a distance between the second wall surface 342 and the inner wall surface 241 is a second distance. In this embodiment, the first distance is less than the second distance. In other implementations, magnets 340 are fastened in the middle of the accommodating space 311 of the penholder in the X-axis direction, the magnets 340 are symmetrically disposed along an axis of the penholder in the X-axis direction, and the magnets 340 deviate from an axis of the mounting space 244 in the X-axis direction. After the stylus 300 is mounted in the mounting space 244 of the stylus fastener 240, an axis of the accommodating space 311 of the penholder in the X-axis direction deviates from an axis of the mounting space 244 of the stylus fastener 240 in the X-axis direction. In the direction perpendicular to the X axis, the first distance between the first wall surface 341 and the inner wall surface 241 is less than the second distance between the second wall surface 342 and the inner wall surface 241. In this embodiment, magnetic lines of the body 240A are evenly distributed in the X-axis direction. A distance between the first wall surface 341 of the magnet 340 and the inner wall surface 241 of the stylus fastener 240 is a first distance, a distance between the second wall surface 342 of the magnet 340 and the inner wall surface 241 of the stylus fastener 240 is a second distance, and the first distance is less than the second distance, so that the magnetic adsorption force is strengthened. Therefore, the magnetic repulsion force F21 is less than the magnetic adsorption force F11. Therefore, when the stylus 300 tends to fall off from the stylus fastener 240, the shear force is also significant to prevent the stylus 300 from falling off, thereby fastening the stylus 300 reliably.

Figure 9:
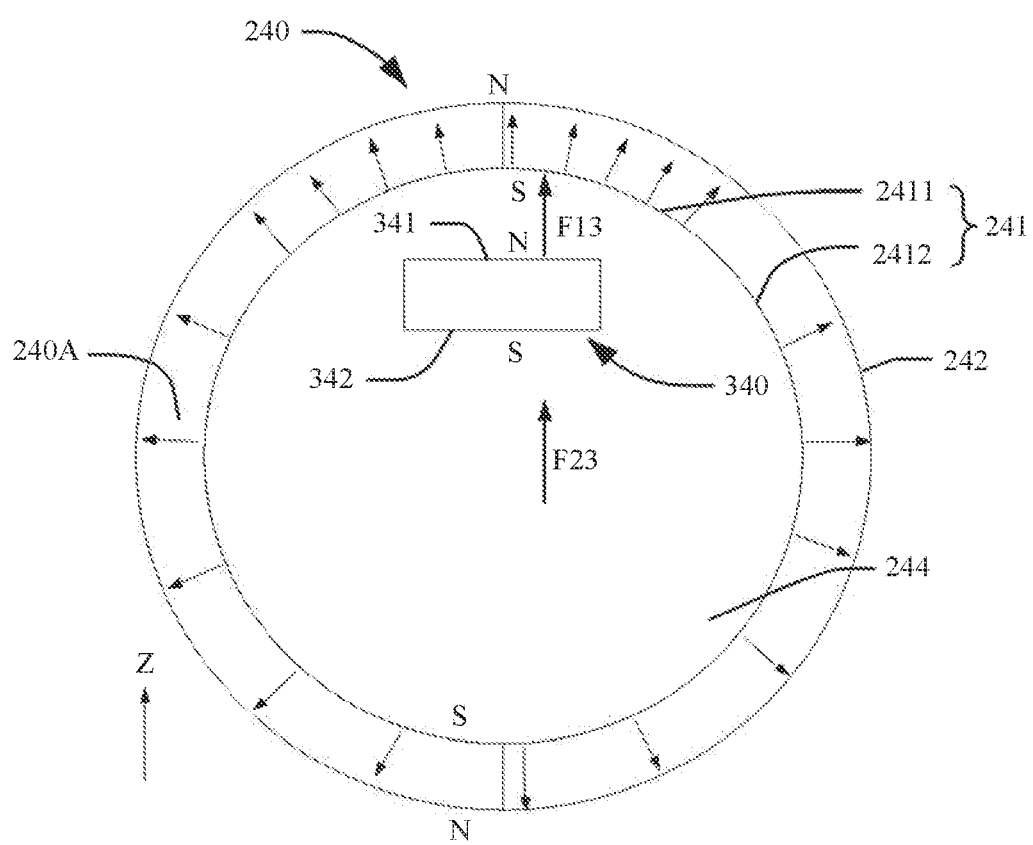
FIG. 9 is a schematic diagram showing a direction of a magnetic acting force between still another magnet and a stylus fastener.

In another implementation of this embodiment, the first magnetic force is greater than the second magnetic force, and the first magnetic force is a magnetic adsorption force. Different from the foregoing embodiments, referring to FIG. 9, FIG. 9 is a schematic diagram of a structure of a magnetic acting force between still another magnet 340 and a stylus fastener. In a direction around the X axis, the inner wall surface 241 includes a first area 2411 and a second area 2412, and a density of magnetic lines of the first area 2411 is higher than that of the second area 2412; and in the direction perpendicular to the X axis, the first wall surface 341 is opposite to a part of the first area 2411, and the second wall surface 342 is opposite to a part of the second area 2412. In other implementations, the first wall surface 341 is disposed opposite to a part of the first area 2411, and the second wall surface 342 is disposed opposite to the entire second area 2412. In other implementations, the first wall surface 341 is disposed opposite to the entire first area 2411, and the second wall surface 342 is disposed opposite to a part of the second area 2412. In the foregoing implementations, a density of magnetic lines of the first area 2411 that is of the inner wall surface 241 and that is opposite to the first wall surface 341 may be higher than that of the second area 2412 that is of the inner wall surface 241 and that is opposite to the second wall surface 342. In an implementation, a distance between the first wall surface 341 of the magnet 340 and the inner wall surface 241 of the stylus fastener 240 is a first distance, a distance between the second wall surface 342 and the inner wall surface 241 is a second distance, and the first distance is less than the second distance. The inner wall surface 241 and the first wall surface 341 generate a magnetic adsorption force F13, and the inner wall surface 241 and the second wall surface 342 generate a magnetic repulsion force F23. A force generated by the magnetic adsorption force F13 on the stylus 300 and a force generated by the magnetic repulsion force F23 on the stylus 300 have the same direction, and both are radially outward along the stylus fastener 240. Therefore, a magnetic acting force F03 between the magnet 340 and the stylus fastener 240 is equal to F13+F23, and the magnetic acting force F03 is radially outward along the stylus fastener 240. A density of magnetic lines of an area that is of the inner wall surface 241 and that is opposite to the first wall surface 341 is higher, so that the magnetic adsorption force is strengthened, and the first distance is less than the second distance, so as to further strengthen the magnetic adsorption force, and finally ensure that the magnetic adsorption force is obviously greater than the magnetic repulsion force. Therefore, connection stability between the magnet 340 and the stylus fastener 240 is greatly improved, thereby improving fastening stability of the stylus 300.

Figure 10:
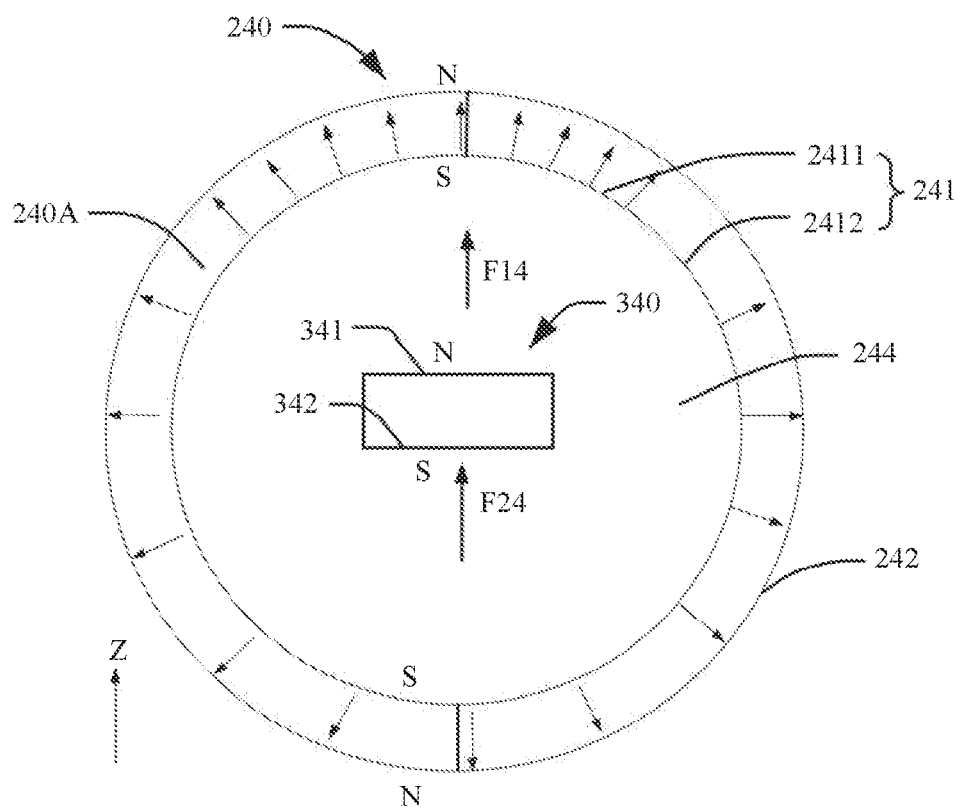
FIG. 10 is a schematic diagram showing a direction of a magnetic acting force between yet another magnet and a stylus fastener.

In still another implementation, referring to FIG. 10, FIG. 10 is a schematic diagram of a structure of a magnetic acting force between yet another magnet 340 and a stylus fastener. Magnets 340 are fastened in the middle of the accommodating space 311 in the X-axis direction, and in this case, the magnets 340 are symmetrically disposed along an axis of the penholder in the X-axis direction. In the direction around the X axis, the inner wall surface 241 includes a first area 2411 and a second area 2412. A density of magnetic lines of the first area 2411 is higher than that of the second area 2412, and in the direction perpendicular to the X axis, the first wall surface 341 is opposite to a part of the first area 2411, and the second wall surface 342 is opposite to a part of the second area 2412. In other implementations, the first wall surface 341 is disposed opposite to a part of the first area 2411, and the second wall surface 342 is disposed opposite to the entire second area 2412. In other implementations, the first wall surface 341 is disposed opposite to the entire first area 2411, and the second wall surface 342 is disposed opposite to a part of the second area 2412. In the foregoing implementations, a density of magnetic lines of the first area 2411 that is of the inner wall surface 241 and that is opposite to the first wall surface 341 may be higher than that of the second area 2412 that is of the inner wall surface 241 and that is opposite to the second wall surface 342. That the first wall surface 341 is opposite to the entire first area 2411 means that a projection that is of the first wall surface 341 and that is on the first area 2411 in the Z-axis direction coincides with the first area 2411; and that the first wall surface 341 is opposite to a part of the first area 2411 means that a projection that is of the first wall surface and that is on the first area 2411 in the Z-axis direction covers a part of the first area 2411, but does not cover the entire first area 2411.

For a relative relationship between the second wall surface 342 and the second area 2412, refer to a relative relationship between the first wall surface 341 and the first area 2411. Therefore, details are not described again After the stylus 300 is mounted in the mounting space 244 of the stylus fastener 240, an axis of the accommodating space 311 of the penholder in the X-axis direction coincides with an axis of the mounting space 244 of the stylus fastener 240 in the X-axis direction. Therefore, in the direction perpendicular to the X axis, the first distance between the first wall surface 341 and the inner wall surface 241 is the same as the second distance between the second wall surface 342 and the inner wall surface 241. The inner wall surface 241 and the first wall surface 341 generate a magnetic adsorption force F14, and the inner wall surface 241 and the second wall surface 342 generate a magnetic repulsion force F24. A force generated by the magnetic adsorption force F14 on the stylus 300 and a force generated by the magnetic repulsion force F24 on the stylus 300 have the same direction, and both are radially outward along the stylus fastener 240. Therefore, a magnetic acting force F04 between the magnet 340 and the stylus fastener 240 is equal to F14+F24, and the magnetic acting force F04 is radially outward along the stylus fastener 240. Therefore, the first distance is equal to the second distance, and a density of magnetic lines of an area that is of the inner wall surface 241 and that is opposite to the first wall surface 341 is higher than that of an area that is of the inner wall surface 241 and that is opposite to the second wall surface 342, so that the magnetic adsorption force is strengthened, thereby ensuring that the magnetic adsorption force is greater than the magnetic repulsion force, and improving fastening reliability of the stylus 300.

A 3D simulation software is used to simulate a fastening force between the stylus 300 and the stylus fastener 240 in the first embodiment of this embodiment. More specifically, a maxwell 3D (maxwell 3D) simulation software is used for simulation, so as to analyze a first magnetic force and a shear force between the magnet 340 and the stylus fastener 240, and analyze a first magnetic force and a shear force between an iron ring and a magnet 340 in the conventional technology. Results from simulation analysis are shown in Table 1. The shear force is a force that is generated by the first magnetic force to stabilize the stylus 300 in the stylus fastener 240 when the stylus 300 tends to fall off from the stylus fastener 240, and a direction of the shear force is parallel to the X-axis direction.

TABLE 1

|  | Magnet 340 and iron ring | Magnet 340 and stylus fastener | Optimized amount |
|---|---|---|---|
| Magnetic acting force (millinewton/mN) | 1.43 mN | 21.23 mN | 1300% |
| Shear force (newton/N) | 0.82 N | 2.5 N | 200% |

During the simulation analysis, the magnet 340 matched with the iron ring and the magnet 340 matched with the stylus fastener 240 have the same properties, such as volume. It can be learned from Table 1 that when the magnet 340 cooperates with the iron ring to fasten the stylus 300, a magnetic acting force between the magnet 340 and the iron ring is 1.43 mN, and a shear force between the magnet 340 and the iron ring is 0.82 N; and when the magnet 340 cooperates with the stylus fastener 240 to fasten the stylus 300, a magnetic acting force between the magnet 340 and the stylus fastener 240 is 21.24 mN, and a shear force between the magnet 340 and the stylus fastener 240 is 2.5 N. An optimized amount of the magnetic acting force is as follows: (21.23−1.43)/1.43≈1300%; and an optimized amount of the shear force is as follows: (2.5−0.82)/0.82=200%. It can be learned that when the stylus fastener 240 cooperates with the magnet 340 to fasten the stylus 300, an optimized amount of the magnetic acting force is 1300%, and an optimized amount of the shear force is 200%.

It can be learned that compared with an annular magnet 340 in the conventional technology, a magnetic acting force and a shear force of an annular stylus fastener 240 provided with radial magnetic lines are greatly improved, especially the shear force is increased at a newton level, so that the shear force is improved more significantly, thereby effectively preventing the stylus 300 from falling off. In this embodiment of this application, the magnet 340 cooperates with the stylus fastener 240, and magnetic lines of the stylus fastener 240 are radially distributed, so that the magnetic acting force and the shear force are effectively strengthened, and fastening reliability of the stylus 300 is improved to prevent the stylus 300 from falling off from the electronic device 1000, and the stylus 300 can be easily placed and taken.

A second embodiment of this application differs from the foregoing embodiments in that the second magnetic force is greater than the first magnetic force, and the second magnetic force is a magnetic adsorption force. When the second magnetic force is greater than the first magnetic force, and the second magnetic force is a magnetic adsorption force, the first magnetic force is a magnetic repulsion force, and the magnetic adsorption force and the magnetic repulsion force have the same direction. Due to the magnetic repulsion force, the stylus 300 tends to move close to a direction of the adsorption force, so as to further improve fastening reliability of the stylus 300. If the magnetic adsorption force is greater than the magnetic repulsion force, a situation in which the magnet 340 and the stylus fastener 240 repel each other due to an excessive magnetic repulsion force may be prevented, so as to avoid affecting fastening of the stylus 300.

Figure 11:
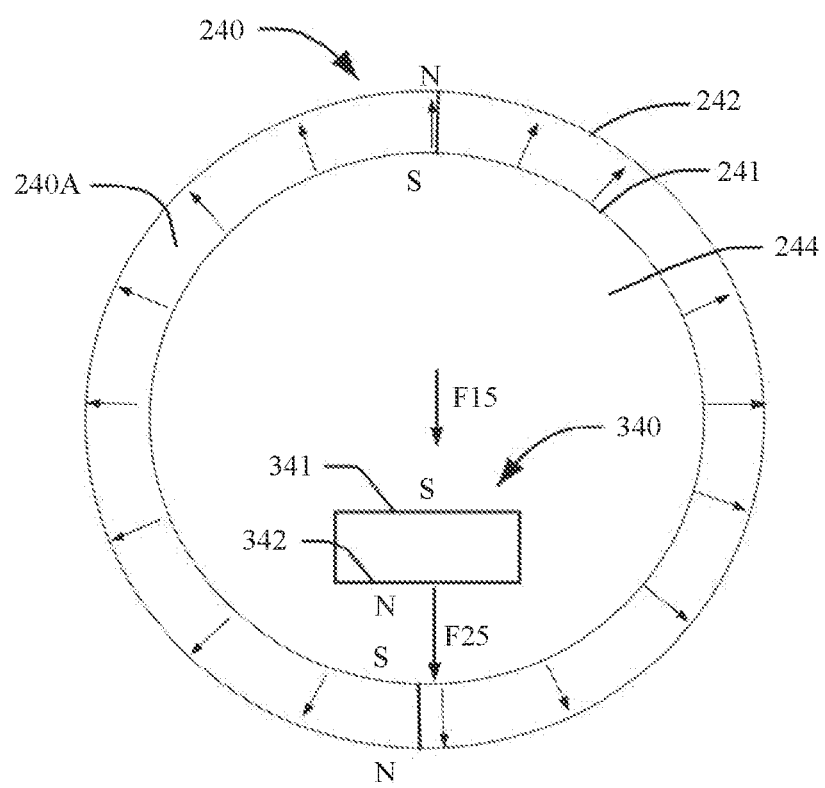
FIG. 11 is a schematic diagram showing a direction of a magnetic acting force between still yet another magnet and a stylus fastener.

In the second embodiment, referring to FIG. 11, FIG. 11 is a schematic diagram showing a direction of a magnetic acting force between still yet another magnet 340 and a stylus fastener 240. The second magnetic force is greater than the first magnetic force, and the second magnetic force is a magnetic adsorption force. A direction of magnetic lines of the body 240A is from the inner wall surface 241 to the outer wall surface 242, and the magnetic lines of the body 240A are evenly distributed in the X-axis direction. The first polarity is an S pole, the second polarity is an N pole, the first wall surface 341 has a polarity of the S pole, and the second wall surface 342 has a polarity of the N pole. In this case, the inner wall surface 241 and the first wall surface 341 generate a magnetic repulsion force F15, and the inner wall surface 241 and the second wall surface 342 generate a magnetic adsorption force F25. A force generated by the magnetic repulsion force F15 on the stylus 300 and a force generated by the magnetic adsorption force F25 on the stylus 300 have the same direction, and both are radially outward along the stylus fastener 240. Therefore, a magnetic acting force F05 between the magnet 340 and the stylus fastener 240 is equal to F15+F25, and the magnetic acting force F05 is radially outward along the stylus fastener 240, so that a fastening force on the stylus 300 from the stylus fastener is strengthened, thereby further improving the fastening stability.

Figure 12:
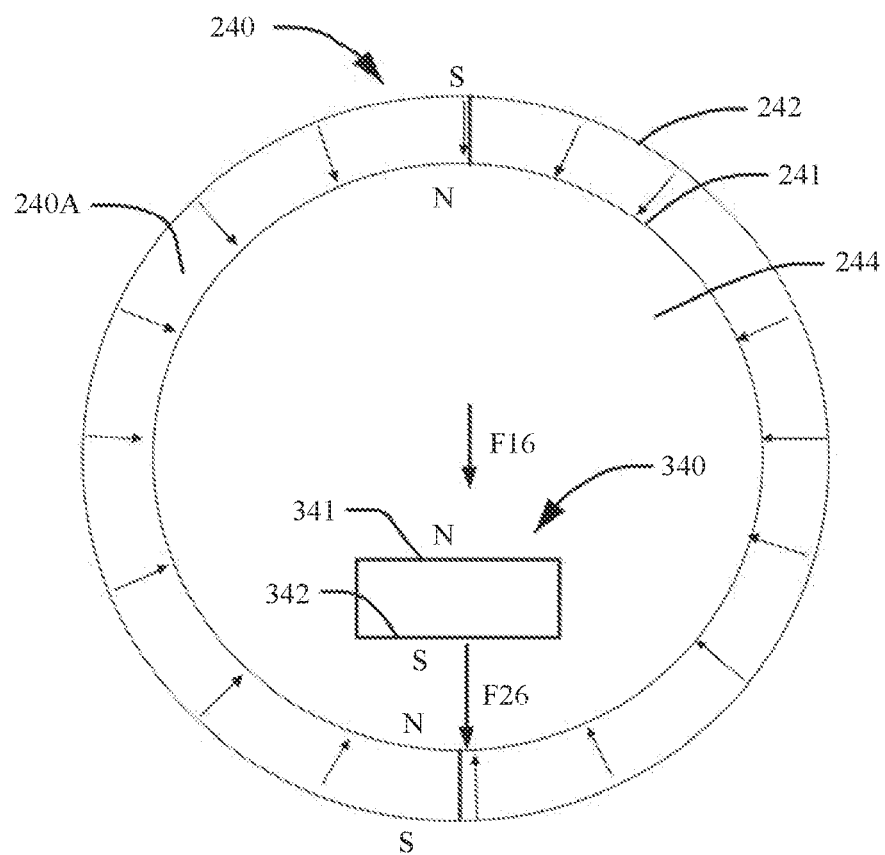
FIG. 12 is a schematic diagram showing a direction of a magnetic acting force between a further magnet and a stylus fastener.

In another implementation of the second embodiment, referring to FIG. 12, FIG. 12 is a schematic diagram showing a direction of a magnetic acting force between a further magnet 340 and a stylus fastener 240. A direction of magnetic lines of the body 240A is from the outer wall surface 242 to the inner wall surface 241, the first polarity is an N pole, the second polarity is an S pole, the first wall surface 341 has a polarity of the N pole, and the second wall surface 342 has a polarity of the S pole. In this case, the inner wall surface 241 and the first wall surface 341 generate a magnetic repulsion force F16, and the inner wall surface 241 and the second wall surface 342 generate a magnetic adsorption force F26. A force generated by the magnetic repulsion force F16 on the stylus 300 and a force generated by the magnetic adsorption force F26 on the stylus 300 have the same direction, and both are radially outward along the stylus fastener 240. Therefore, a magnetic acting force F06 between the magnet 340 and the stylus fastener 240 is equal to F16+F26, and the magnetic acting force F06 is radially outward along the stylus fastener 240, so that a fastening force on the stylus 300 from the stylus fastener is strengthened, thereby improving fastening stability of the stylus 300.

In an implementation of the second embodiment, the second magnetic force is greater than the first magnetic force, and the second magnetic force is a magnetic adsorption force. Magnetic lines of the body 240A are evenly distributed in an extension direction of the body 240A. In the direction perpendicular to the X axis, a distance between the first wall surface 341 and the inner wall surface 241 is a first distance, a distance between the second wall surface 342 and the inner wall surface 241 is a second distance, and the first distance is greater than the second distance, so that the magnetic adsorption force is strengthened. Therefore, the magnetic repulsion force F21 is less than the magnetic adsorption force F11. Therefore, when the stylus 300 tends to fall off from the stylus fastener 240, the shear force is also significant to prevent the stylus 300 from falling off, thereby fastening the stylus 300 reliably.

In another implementation of the second embodiment, the second magnetic force is greater than the first magnetic force, and the second magnetic force is a magnetic adsorption force. Specifically, in a direction around the X axis, the inner wall surface 241 includes a first area and a second area, and a density of magnetic lines of the first area is lower than that of the second area; and in the direction perpendicular to the X axis, the first wall surface 341 is opposite to a part of the first area, and the second wall surface 342 is opposite to a part of the second area. In other implementations, the first wall surface 341 is opposite to a part of the first area, and the second wall surface 342 is opposite to the entire second area. In other implementations, the first wall surface 341 is opposite to the entire first area, and the second wall surface 342 is opposite to a part of the second area. In the foregoing implementations, a density of magnetic lines of the first area that is of the inner wall surface 241 and that is opposite to the first wall surface 341 may be lower than that of the second area that is of the inner wall surface 241 and that is opposite to the second wall surface 342. In an implementation, a distance between the first wall surface 341 of the magnet 340 and the inner wall surface 241 of the stylus fastener 240 is a first distance, a distance between the second wall surface 342 and the inner wall surface 241 is a second distance, and the first distance is greater than the second distance. Therefore, a density of magnetic lines of an area that is of the inner wall surface 241 and that is opposite to the second wall surface 342 is higher, so that the magnetic adsorption force is strengthened, and the first distance is greater than the second distance, so as to further strengthen the magnetic adsorption force, and finally ensure that the magnetic adsorption force is obviously greater than the magnetic repulsion force. Therefore, connection stability between the magnet 340 and the stylus fastener 240 is greatly improved, thereby improving fastening stability of the stylus 300.

In still another implementation of the second embodiment, magnets 340 are fastened in the middle of the accommodating space 311 in the X-axis direction, and in this case, the magnets 340 are symmetrically disposed along an axis of the penholder in the X-axis direction. In addition, in the direction around the X axis, the inner wall surface 241 includes a first area and a second area, and a density of magnetic lines of the first area is lower than that of the second area; and in the direction perpendicular to the X axis, the first wall surface 341 is opposite to a part of the first area, and the second wall surface 342 is opposite to a part of the second area. In other implementations, the first wall surface 341 is opposite to a part of the first area, and the second wall surface 342 is opposite to the entire second area. In other implementations, the first wall surface 341 is opposite to the entire first area, and the second wall surface 342 is opposite to a part of the second area. In the foregoing implementations, a density of magnetic lines of the first area that is of the inner wall surface 241 and that is opposite to the first wall surface 341 may be lower than that of the second area that is of the inner wall surface 241 and that is opposite to the second wall surface 342. After the stylus 300 is mounted in the mounting space 244 of the stylus fastener 240, an axis of the accommodating space 311 of the penholder in the X-axis direction coincides with an axis of the mounting space 244 of the stylus fastener 240 in the X-axis direction. Therefore, in the direction perpendicular to the X axis, the first distance between the first wall surface 341 and the inner wall surface 241 is the same as the second distance between the second wall surface 342 and the inner wall surface 241. Therefore, the first distance is equal to the second distance, and a density of magnetic lines of an area that is of the inner wall surface 241 and that is opposite to the first wall surface 341 is lower than that of an area that is of the inner wall surface 241 and 2s that is opposite to the second wall surface 342, so that the magnetic adsorption force is strengthened, thereby ensuring that the magnetic adsorption force is greater than the magnetic repulsion force, and improving fastening reliability of the stylus 300.

Still referring to FIG. 6 and FIG. 7, in an embodiment, widths of the first wall surface 341, the second wall surface 342, and the inner wall surface 241 are the same in the X-axis direction. Assembly errors and machining errors are allowed here. Specifically, because a difference in dimensions of the magnet 340 and the stylus fastener 240 in the X-axis direction affects a position where the stylus 300 is inserted, the larger the difference in dimensions of the magnet 340 and the stylus fastener 240, the position of the stylus 300 may change each time the stylus 300 is inserted. Therefore, if the first wall surface 341, the second wall surface 342 and the inner wall surface 241 are disposed to have the same width in the X-axis direction, the magnet 340 and the stylus fastener 240 are aligned in the X-axis direction when the stylus 300 is mounted in the mounting space 244 in the X-axis direction. Then, each time the stylus 300 is inserted into the stylus fastener 240 after use, the position of the stylus 300 is basically fixed to prevent a tip or a protective cap of the stylus 300 from extending out of the support apparatus 200. Dimensions of the first wall surface 341, the second wall surface 342, and the inner wall surface 241 are the same within allowable ranges of machining errors and assembly errors.

In a specific implementation, a width of the first wall surface 341 and a width of the second wall surface 342 of the magnet 340, and a width of the inner wall surface 241 of the stylus fastener 240 are the same. Here, the width of the first wall surface 341, the width of the second wall surface 342, and the width of the inner wall surface 241 are dimensions in the X-axis direction. Specifically, a width of the inner wall surface 241 of the stylus fastener 240 is a, and widths of both the first wall surface 341 and the second wall surface 342 of the magnet 340 are b, and then in an implementation, a is equal to b. In another implementation, due to existence of machining errors and assembly errors, the width of the first wall surface 341 and the width of the second wall surface 342 of the magnet 340, and the width of the inner wall surface 241 of the stylus fastener 240 are also considered to be the same when a and b satisfy the following relationship: a is greater than or equal to 0.9a and less than or equal to 1.1a. Therefore, after the stylus 300 is inserted into the mounting space 244, the first wall surface 341, the second wall surface 342, and the inner wall surface 241 will not have different locating positions each time due to width differences, to ensure that the stylus fastener and the magnet 340 are basically aligned in a width direction, so that fastened positions of the stylus 300 are basically consistent after each insertion. This prevents the stylus 300 from being inserted at a different position each time, and ensures that neither a tip nor a protective cap of the stylus 300 extends beyond a contour of the support apparatus 200 each time the stylus 300 is inserted.

Still referring to FIG. 6 and FIG. 7, in the X-axis direction, widths of the inner wall surface 241 and the outer wall surface 242 of the stylus fastener are the same. Machining errors are allowed here. In a specific implementation, a width of the inner wall surface 241 is a, and a width of the outer wall surface 242 is c, and then in an implementation, a is equal to c. In another implementation, a and c are also considered to be the same if the following relationship is satisfied: a is greater than or equal to 0.9c and less than or equal to 1.1c. Therefore, machining of the stylus fastener can be facilitated.

Still referring to FIG. 6, in this embodiment, the accommodating space 311 of the penholder is provided with a plurality of magnets 340. Therefore, correspondingly, a quantity of the stylus fasteners 240 is more than one, the plurality of stylus fasteners 240 are equally spaced in the X-axis direction, and mounting spaces 244 of the plurality of stylus fasteners 240 are coaxially disposed, where "a plurality of" means two or more. When the stylus 300 is mounted, the stylus 300 sequentially runs through the plurality of stylus fasteners 240. In this case, the plurality of magnets 340 are in a one-to-one correspondence with the plurality of stylus fasteners 240, and a magnetic acting force is generated between each set of magnets 340 and stylus fasteners 240, so that fastening reliability of the stylus 300 can be improved. The plurality of stylus fasteners 240 are equally spaced, so that the stylus 300 is uniformly stressed and has higher stability. In other embodiments, a quantity of the stylus fasteners 240 is one, the one stylus fastener 240 is fastened in the middle of the accommodating groove 231, and the middle of the accommodating groove 231 means any position between two ends of the accommodating groove 231, so as to reduce costs, reduce a weight of the support apparatus 200, and reduce a burden of a user to carry the electronic device 1000 provided with the support apparatus 200. The one stylus fastener 240 may also be fastened at either end of the accommodating groove 231 to facilitate mounting of the stylus fastener 240.

In this embodiment, a quantity of the stylus fasteners 240 is three, two of the stylus fasteners 240 are equally spaced on a side wall of the accommodating groove 231 of the connecting part 230 in an X-axis direction of the accommodating groove 231, and an X-axis direction of the stylus fasteners 240 is the same as that of the accommodating groove 231. Correspondingly, a quantity of the magnets 340 on the stylus 300 is three. After the stylus 300 is mounted in mounting spaces 244 of the stylus fasteners 240, the three stylus fasteners 240 are in a one-to-one correspondence with the three magnets 340, which can improve fastening strength of the stylus fastener 240. Two of the three stylus fasteners 240 fasten two ends of the stylus 300 in the X-axis direction respectively, and the other stylus fastener 240 fastens a middle of the stylus 300 in the X-axis direction, so that the stylus 300 is uniformly stressed and has high fastening reliability.

In an embodiment, a quantity of the stylus fasteners 240 is four, the four stylus fasteners 240 are equally spaced on a side wall of the accommodating groove 231 of the connecting part 230 in an X-axis direction of the accommodating groove 231, and an X-axis direction of the stylus fasteners 240 is the same as that of the accommodating groove 231. Correspondingly, a quantity of the magnets 340 on the stylus 300 is four. After the stylus 300 is mounted in mounting spaces 244, the four stylus fasteners 240 are in a one-to-one correspondence with four magnets 340, so as to fasten the stylus 300 reliably. Two of the four stylus fasteners 240 fasten two ends of the stylus 300 in the X-axis direction respectively, and the other two stylus fasteners 240 fasten a middle of the stylus 300 in the X-axis direction. Because the stylus 300 is long, the two stylus fasteners in the middle improve fastening reliability at the middle of the stylus 300, thereby further improving firmness of the stylus 300.

Figure 13:
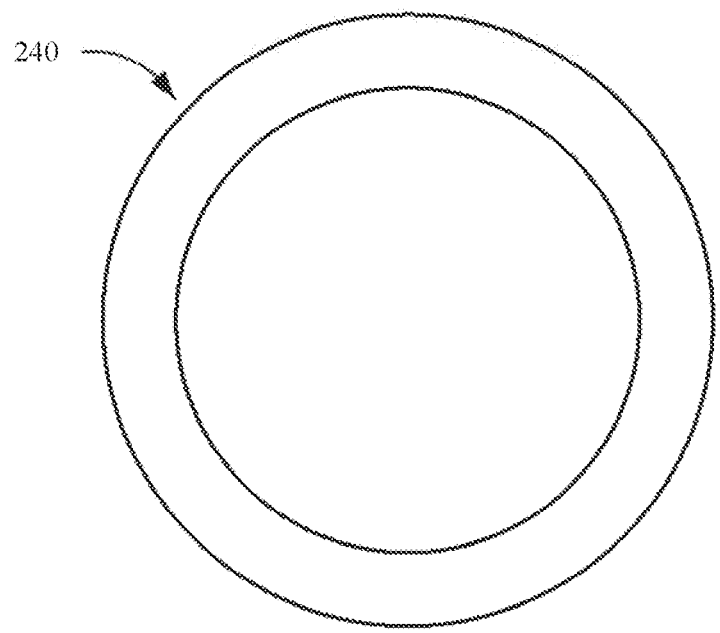
FIG. 13 is a schematic diagram of a structure of an integrally formed stylus fastener.

The stylus fastener according to any one of the foregoing embodiments may be integrally formed. FIG. 13 is a schematic diagram of a structure of an integrally formed stylus fastener. The integrally formed stylus fastener has high uniformity of magnetic lines, and stability of the first magnetic force and the second magnetic force between the integrally formed stylus fastener and the magnet 340 is higher, so as to improve fastening stability of the stylus 300.

Figure 14:
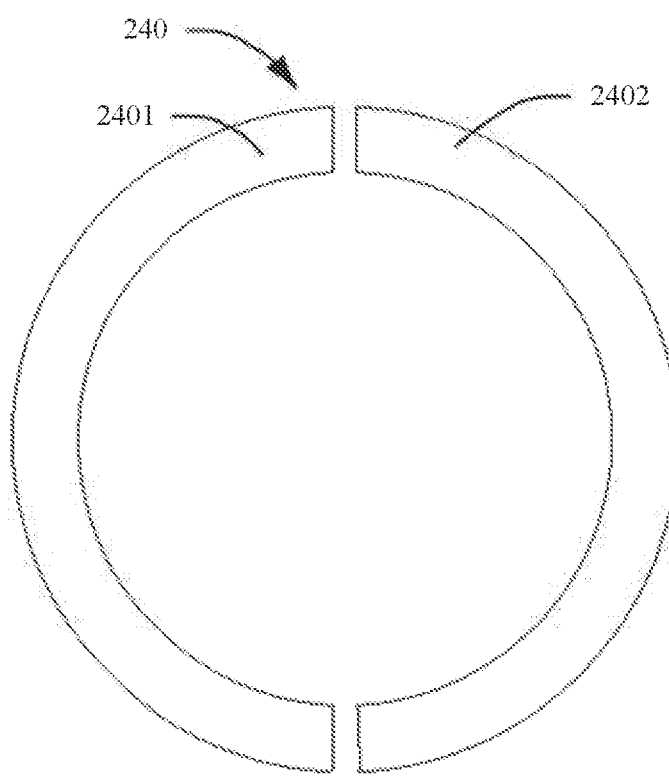
FIG. 14 is a schematic diagram of a structure of a stylus fastener that is equally divided into two parts.

In this embodiment, referring to FIG. 14, FIG. 14 is a schematic diagram of a structure of a stylus fastener that is equally divided into two parts. A stylus fastener 240 is annular and is separately formed. Specifically, the stylus fastener 240 is divided into two magnets for machining, and the two parts are a first magnet 2401 and a second magnet 2402. Both the first magnet 2401 and the second magnet 2402 are semicircular, and an inner cambered surface of the first magnet 2401 and an inner cambered surface of the second magnet 2402 enclose into a circular mounting space 244. In other embodiments, lengths, widths, and thicknesses of the first magnet 2401 and the second magnet 2402 are equal, and central angles of the first magnet 2401 and the second magnet 2402 are both 175°. After the first magnet 2401 and the second magnet 2402 are mounted in the support apparatus 200, there is a gap between the first magnet 2401 and the second magnet 2402, which can ensure an adsorption force between the stylus fastener and the magnets of the stylus, and can also reduce volumes of the first magnet 2401 and the second magnet 2402 to save costs. In some other embodiments, the first magnet 2401 and the second magnet 2402 are two unequal parts, a central angle of the first magnet 2401 is 90°, and a central angle of the second magnet is 270°; or a central angle of the first magnet is 100°, and a central angle of the second magnet is 260°. After the stylus fastener 240 is divided into two parts for machining, magnetization difficulty is reduced, and magnetization costs are reduced. In other embodiments, the stylus fastener is integrally formed into a whole ring, or is separately formed into three parts, four parts, five parts, and the like. The stylus fastener is divided into two magnets for machining. A magnet volume is less than that of a whole-ring stylus fastener, so that the stylus fastener cannot be easily damaged during transportation, and transportation costs are reduced. After the stylus fastener is divided into two magnets, an instantaneous current required for magnetizing is lower than that of the whole-ring stylus fastener, and an impact force of a magnetic field generated by the instantaneous current on the magnet is weakened. Therefore, there is no need to make a special clamp for magnetizing the magnet, and a common clamp may be used for magnetization, so as to reduce magnetization costs.

Figure 15:
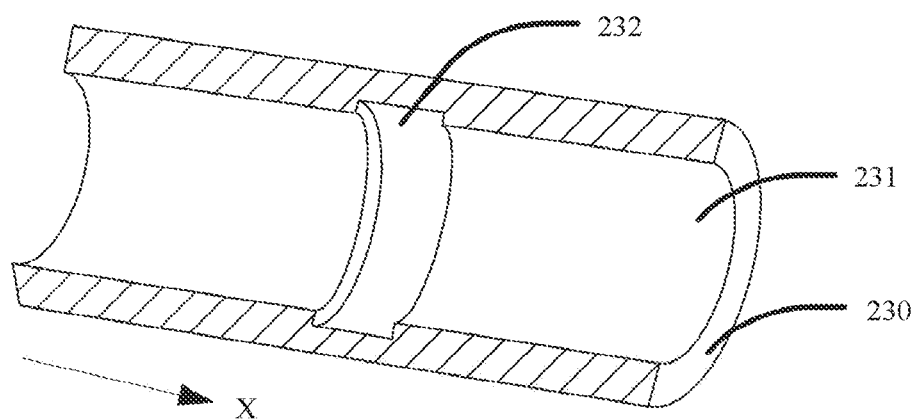
FIG. 15 is a schematic diagram of a structure of an annular groove disposed on a wall of an accommodating groove of a connecting part.

In this embodiment, the stylus fastener 240 is fastened in the accommodating groove 231 by using an adhesive. Specifically, referring to FIG. 15, FIG. 15 is a schematic diagram of a structure of an annular groove disposed on a wall of an accommodating groove of a connecting part. The annular groove 232 is disposed on a wall of the accommodating groove 231, the annular groove 232 is formed around the X axis, and the stylus fastener 240 is mounted in the annular groove 232. Specifically, after coating the adhesive on the outer wall surface 242 of the first magnet 2401, and coating the adhesive on the outer wall surface 242 of the second magnet 2402, the first magnet 2401 and the second magnet 2402 are mounted in the annular groove 232, so that the stylus fastener 240 is fastened in the accommodating groove 231 by a limiting effect of the annular groove 232 and a fastening effect of the adhesive A width of the annular groove 232 in the X-axis direction is slightly greater than that of the stylus fastener 240 in the X-axis direction, so that the first magnet 2401 and the second magnet 2402 may be smoothly mounted in the annular groove 232.

Figure 16:
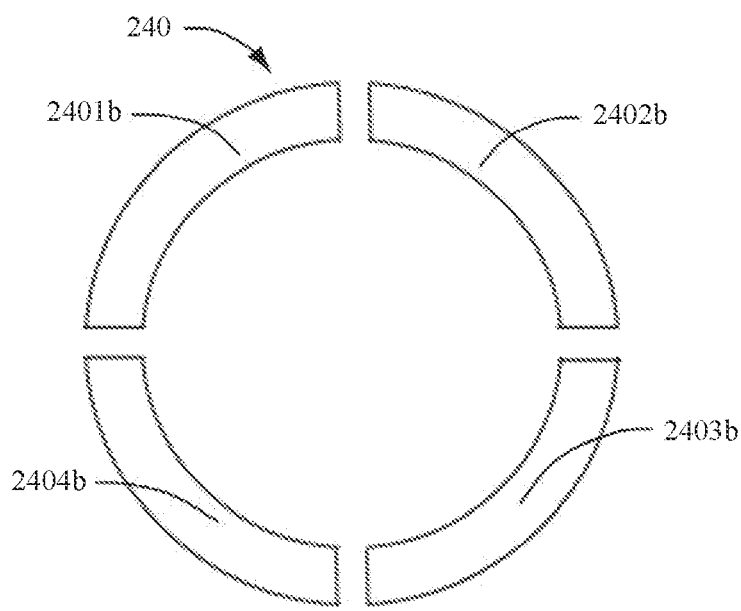
FIG. 16 is a schematic diagram of a structure of a stylus fastener that is equally divided into four parts.

In an embodiment, referring to FIG. 16, FIG. 16 is a schematic diagram of a structure of a stylus fastener that is equally divided into four parts. The stylus fastener 240 is divided into four magnets, specifically including: a first magnet 2401*b*, a second magnet 2402*b*, a third magnet 2403*b*, and a fourth magnet 2404*b*. In the case of equal parts, central angles of the first magnet 2401*b* to the fourth magnet 2404*b* are all 90°. After the stylus fastener is divided into four parts, a magnet volume of each part is further reduced, so that a damage rate during transportation is further reduced, thereby reducing costs. During magnetization, an instantaneous current required for magnetization is further reduced, a required clamp is further simplified, and a volume of the clamp is correspondingly reduced, thereby further reducing magnetization costs.

Figure 17:
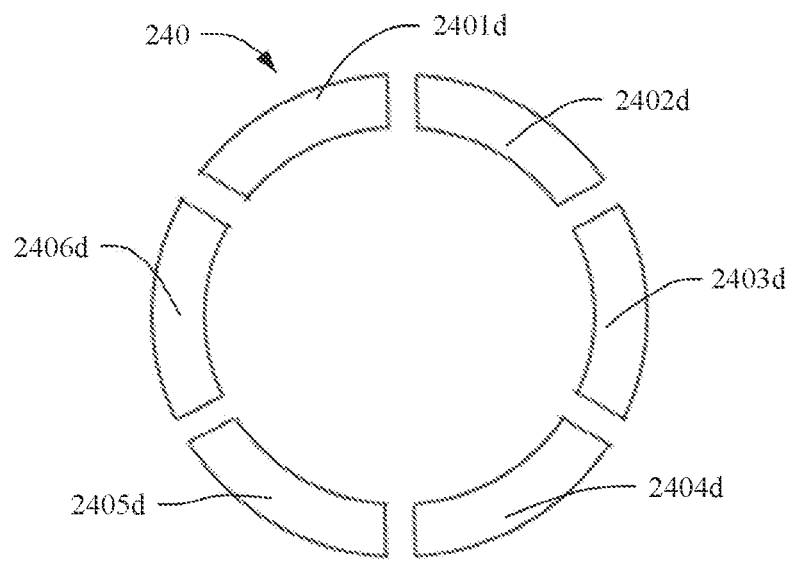
FIG. 17 is a schematic diagram of a structure of a stylus fastener that is equally divided into six parts.

In another embodiment, referring to FIG. 17, FIG. 17 is a schematic diagram of a structure of a stylus fastener that is equally divided into six parts. The stylus fastener 240 is divided into six magnets, specifically including: a first magnet 2401*d*, a second magnet 2402*d*, a third magnet 2403*d*, a fourth magnet 2404*d*, a fifth magnet 2405*d*, and a sixth magnet 2406*d*. In the case of equal parts, central angles of the first magnet 2401*d* to the sixth magnet 2406*d* are all 60°. After the stylus fastener is divided into six parts, a magnet volume of each part is smaller, so that the stylus fastener is easier to transport and has lower transportation costs. During magnetization, an instantaneous current required for magnetization is higher, and a clamp has a simpler structure and a smaller volume, so that magnetization costs are lower.

Figure 18:
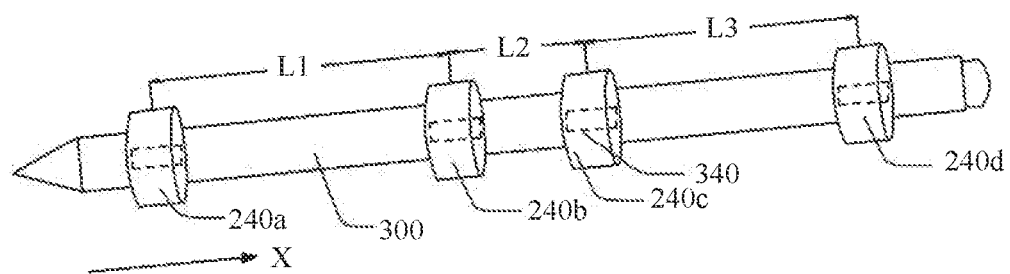
FIG. 18 is a schematic diagram of a structure in which a stylus is mounted in a stylus fastener and stylus fasteners are randomly distributed.

In another embodiment of this application, referring to FIG. 18, FIG. 18 is a schematic diagram of a structure in which a stylus 300 is mounted in a stylus fastener and stylus fasteners are randomly distributed. The accommodating space 311 of the penholder is provided with a plurality of magnets 340, and the plurality of magnets 340 are randomly arranged in the X-axis direction of the accommodating space 311. Therefore, correspondingly, a plurality of stylus fasteners 240 are randomly arranged in the X-axis direction. A spacing between magnets 340 located in the middle of the accommodating groove 231 in the X-axis direction is less than a spacing between magnets 340 located at ends. Because the stylus 300 is long, the magnets 340 in the middle of the accommodating groove 231 are densely distributed, so that fastening strength in the middle of the stylus 300 may be improved, and the entire stylus 300 can be reliably fastened. For example, a quantity of the magnets 340 is four, and correspondingly, a quantity of the stylus fasteners 240 is four. The four stylus fasteners 240 are a first stylus fastener 240a, a second stylus fastener 240b, a third stylus fastener 240c, and a fourth stylus fastener 240d; a distance between the first stylus fastener 240a and the second stylus fastener 240b is L1, a distance between the second stylus fastener 240b and the third stylus fastener 240c is L2, and a distance between the third stylus fastener 240c and the fourth stylus fastener 240d is L3, where L1 is equal to L3, L1 is greater than L2; and the second stylus fastener 240b and the third stylus fastener 240c are symmetrically distributed along a central plane in the X-axis direction of the accommodating groove 231. After the stylus 300 is inserted into the stylus fastener 240, the four stylus fasteners 240 are in a one-to-one correspondence with the four magnets 340. The second stylus fastener 240b and the third stylus fastener 240c can better fasten the middle of the stylus 300, and the first stylus fastener 240a and the fourth stylus fastener 240d can better fasten two ends of the stylus 300, so as to improve fastening reliability of the stylus 300. In other embodiments, both the second stylus fastener 240b and the third stylus fastener 240c are located in the middle of the accommodating groove 231 in the X-axis direction, and are stacked in the X-axis direction, so as to better fasten the stylus 300.

Figure 19:
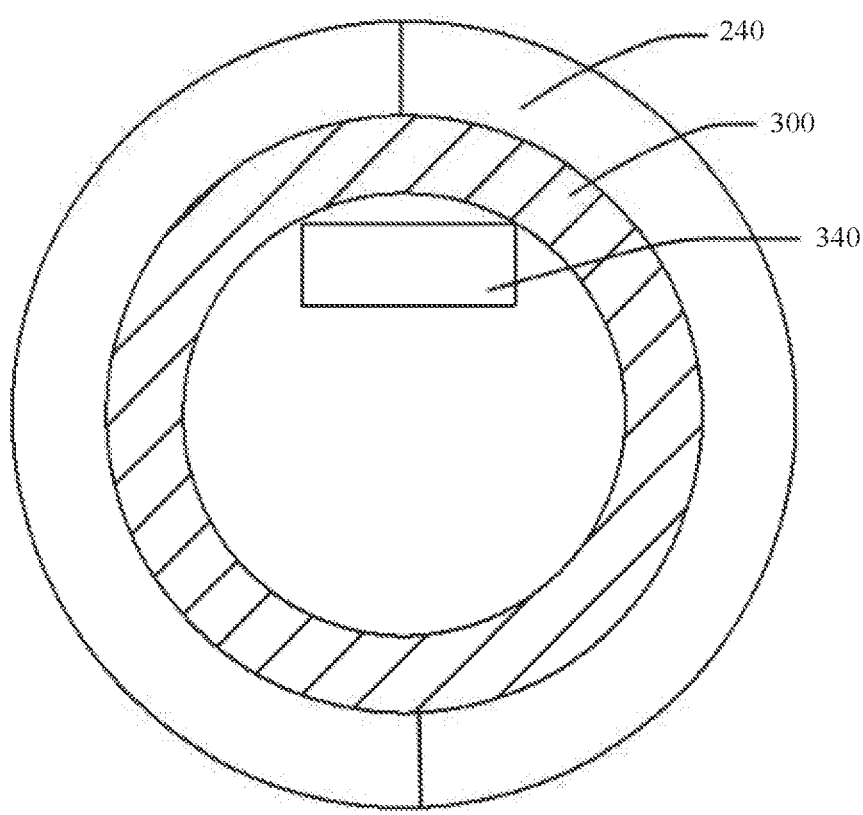
FIG. 19 is a sectional view of a stylus mounted in a stylus fastener.

In this embodiment, referring to FIG. 19, FIG. 19 is a sectional view of a stylus 300 mounted in a stylus fastener 240. The stylus fastener 240 has a circular annular shape, the mounting space 244 also has a circular annular shape, and a cross section of the stylus 300 mounted in the mounting space 244 also has a circular shape. The stylus 300 may be attached to the inner wall surface 241 after being inserted into the mounting space 244, so as to improve fastening stability. In other embodiments, the stylus fastener 240 may be a stylus fastener 240 that has a mounting space 244 and that is of another shape, such as square, ellipse, and triangle, provided that the stylus does not fall off after being inserted into the mounting space 244.

Figure 20:
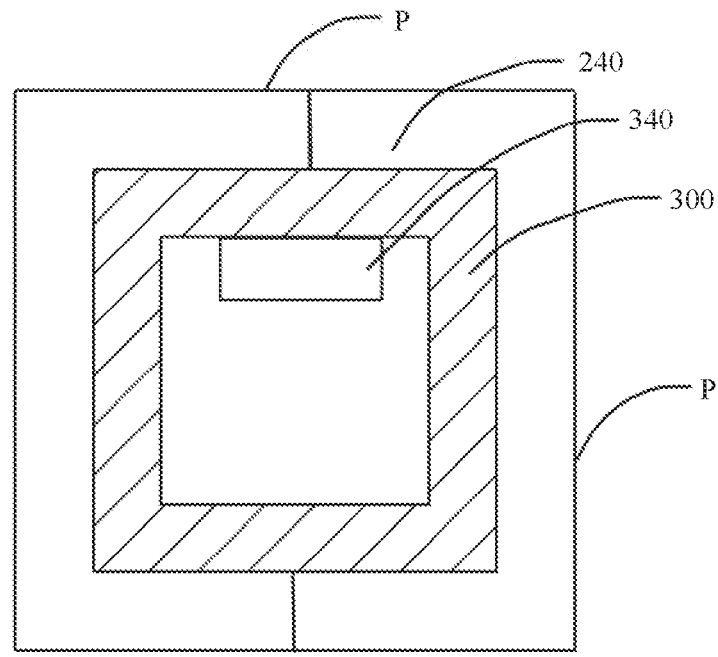
FIG. 20 is a sectional view of a stylus that is of another shape and that is mounted in a stylus fastener.

In an embodiment, referring to FIG. 20, FIG. 20 is a sectional view of a stylus 300 that is of another shape that is mounted in a stylus fastener 240. In this embodiment, the stylus fastener 240 has a square annular shape, the mounting space 244 is square, and a cross section of the stylus 300 mounted in the mounting space 244 is also square. The stylus 300 is attached to the inner wall surface 241 after being inserted into the mounting space 244, so as to improve fastening stability. A cross section of the outer wall surface 242 of the stylus fastener 240 is also square, and shapes of the inner wall surface 241 and the outer wall surface 242 are the same, which also facilitates machining, thereby reducing costs. The outer wall surface 242 with a square cross section has four flat surfaces P, any one of the four flat surfaces P is used as a first plane, and a second plane is disposed on a wall of the accommodating groove 231 correspondingly. When the stylus fastener 240 is fastened to the support apparatus 200, the first plane is attached to the second plane, so that the stylus fastener 240 is in a surface-to-surface contact with the wall of the accommodating groove 231, thereby improving fastening reliability of the stylus fastener 240. The fastening reliability of the stylus fastener 240 is improved, and correspondingly, fastening reliability of the stylus 300 is ensured.

Figure 21:
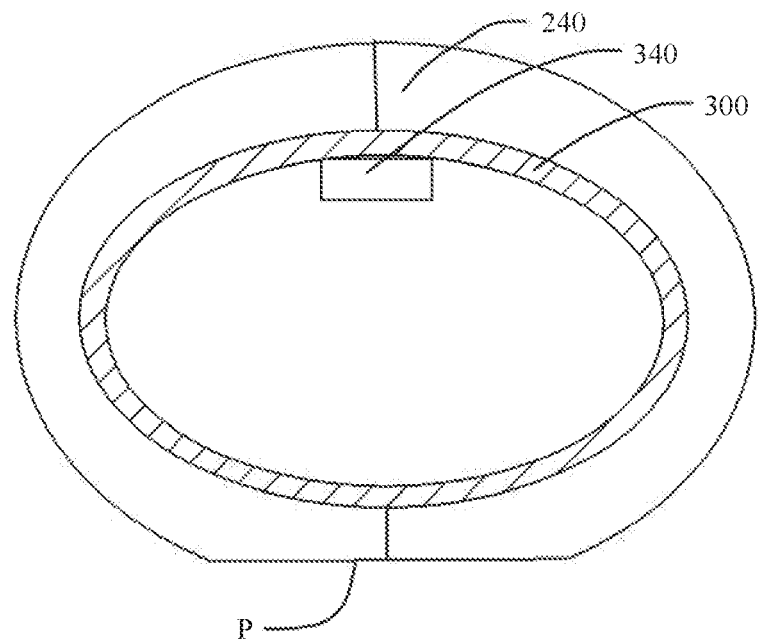
FIG. 21 is a sectional view of a stylus that is of still another shape and that is mounted in a stylus fastener.

In an embodiment, referring to FIG. 21, FIG. 21 is a sectional view of a stylus 300 that is of still another shape and that is mounted in a stylus fastener 240. In this embodiment, the stylus fastener 240 has an elliptical annular shape, the mounting space 244 is elliptical, and across section of the stylus 300 mounted in the mounting space 244 is also elliptical. The stylus 300 is attached to the inner wall surface 241 after being inserted into the mounting space 244. Therefore, a contact area between the stylus 300 and the inner wall surface 241 of the stylus fastener 240 is large, so as to prevent the penholder 310 from rotating in the mounting space 244, thereby improving fastening reliability of the stylus 300, and preventing the stylus 300 from falling off. A part of the outer wall surface 242 of the stylus fastener 240 is arc-shaped, the other part is a flat surface P, and the part that is the flat surface P is parallel to a long axis of an ellipse. Therefore, a volume of the stylus fastener 240 may be less than that of a stylus fastener with an elliptical outer wall surface 242, so that a space occupied by the stylus fastener 240 can be reduced, and the outer wall surface 242 of the part that is the flat surface P of the stylus fastener 240 can be in contact with the support apparatus 200. Therefore, the stylus fastener 240 is in a surface-to-surface contact with the support apparatus 200, thereby improving fastening reliability of the stylus fastener 240.

In this embodiment, the stylus fastener is radially magnetized. During magnetization, the stylus fastener is clamped by using a customized magnetization clamp, then an instantaneous current is applied to the stylus fastener by using an electrified coil, and the stylus fastener is magnetized by using an instantaneous magnetic field generated by the instantaneous current. The integrally formed stylus fastener has a high structural strength and can be easily mounted on the support apparatus 200, so that mounting difficulty may be reduced, thereby accelerating production and improving production efficiency.

A magnetization manner is constant current magnetization or pulse magnetization, which is not limited in this embodiment.

After the magnetization, magnetization uniformity of the stylus fastener is tested. Specifically, a magnetization uniformity test process is as follows: A plurality of test points are selected at different positions on a surface of the stylus fastener after the magnetization to detect surface magnetism at each test point, and errors in surface magnetism at the test points are compared. If errors between the test points are less than 15 millitesla (mT), it proves that magnetization uniformity is good. On the contrary, if errors between the test points are greater than or equal to 15 mT, it proves that magnetization uniformity is poor; and in this case, remagnetization is required, and then demagnetization is required.

Figure 22:
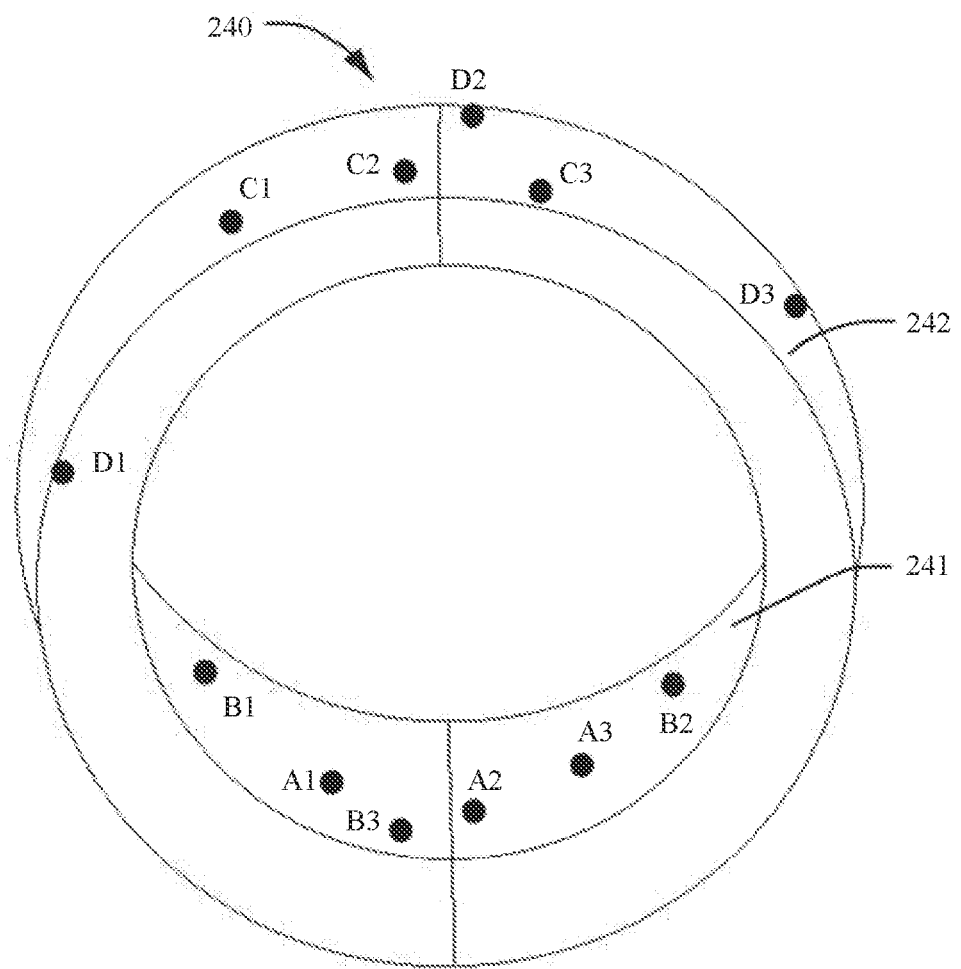
FIG. 22 is a schematic diagram of a sampling structure of test points for testing magnetization uniformity of a stylus fastener.

FIG. 22 is a schematic diagram of a sampling structure of test points for testing magnetization uniformity of a stylus fastener. Specifically, a teslameter is used to take three test points A1, A2, and A3 in the middle of the inner wall surface 241 of the stylus fastener 240, and take three test points B1, B2, and B3 at an edge of the inner wall surface 241. Then a mean value P1 of all test points is calculated, P1=(A1+A2+A3+B1+B2+B3)/6, and an error between each test point and the mean value P1 is compared. If errors between more than 98% of all test points and the mean value are less than 15 mT, it proves that magnetization uniformity of the inner wall surface 241 of the stylus fastener 240 is good.

A teslameter is used to take three test points C1, C2, and C3 in the middle of the outer wall surface 242 of the stylus fastener 240, and take three test points D1, D2, and D3 at an edge of the outer wall surface 242. Then a mean value P2 of all test points is calculated. P2=(C1+C2+C3+D1+D2+D3)/6, and an error between each test point and the mean value P2 is compared. If errors between more than 98% of all test points and the mean value are less than 15 mT, it proves that magnetization uniformity of the outer wall surface 242 of the stylus fastener 240 is good.

Figure 23:
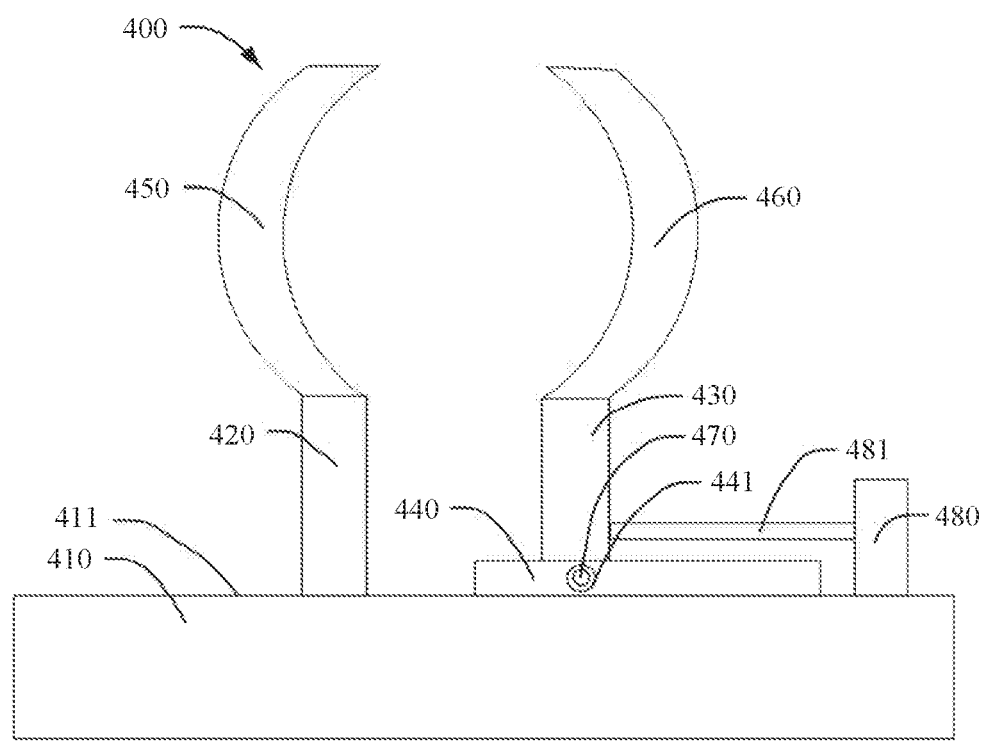
FIG. 23 is a schematic diagram of a structure of a magnetization clamp.

FIG. 23 is a schematic diagram of a structure of a magnetization clamp. Specifically, due to a magnetic field generated by an instantaneous current at the moment of magnetization, the stylus fastener is subjected to a strong rebound force, and the rebound force may cause the stylus fastener to jump, so that a magnetization clamp 400 needs to clamp the stylus fastener to prevent the stylus fastener from jumping. Specifically, the magnetization clamp 400 includes a workbench 410, a first bracket 420, a second bracket 430, a slide rail 440, a first clip 450, a second clip 460, and a locking rod 470. The workbench 410 has a placement end face 411, a bottom end of the first bracket 420 and the slide rail 440 are fastened on the placement end face 411, a bottom end of the second bracket 430 is connected to the slide rail 440, and the second bracket 430 may slide along the slide rail 440 to move close to or away from the first bracket 420. A bottom end of the second bracket 430 is provided with a locating hole, and a plug-in hole 441 corresponding to the locating hole is provided on the slide rail 440. After the second bracket 430 moves in place, the locking rod 470 is inserted into the plug-in hole 441 and the locating hole to lock the second bracket 430. The first clip 450 is fastened on top of the first bracket 420, and the second clip 460 is fastened on top of the second bracket 430. When the second bracket 430 moves, the second clip 460 is driven to move, so that the second clip 460 is close to or away from the first clip 450. The first clip 450 is provided with a first clamping groove facing the second clip 460, and the second clip 460 is provided with a second clamping groove facing the first clip 450. When the second clip 460 is close to the first clip 450, the first clamping groove cooperates with the second clamping groove to clamp the stylus fastener. When the stylus fastener includes two magnets, one of the magnets may be magnetized first, and then the other magnet may be magnetized.

When the stylus fastener is magnetized, the second bracket 430 moves in a direction away from the first bracket 420 along the slide rail 440, so that the first clamping groove (not shown in the figure) and the second clamping groove (not shown in the figure) are away from each other. Then, the stylus fastener 240 is placed between the first clamping groove and the second clamping groove by using a manipulator or manually, and the stylus fastener is as close to the first clamping groove as possible or is in direct contact with an inner wall of the first clamping groove. Then, the second bracket 430 moves in a direction close to the first bracket 420 along the slide rail 440, so that the first clamping groove and the second clamping groove are close to each other until the first clamping groove and the second clamping groove clamp the stylus fastener. Then, the locking rod 470 is inserted into the plug-in hole 441 and the locating hole to lock the second bracket 430, so as to prevent the stylus fastener 240 from falling off due to shaking of the second clip 460.

Still referring to FIG. 23, a driving component 480 is disposed on the placement end face 411, a driving end 481 of the driving component 480 is fastened to the second bracket 430, and the driving component 480 drives the second bracket 430 to move along the slide rail 440, so as to increase a degree of automation, accelerate production, and improve production efficiency. The driving component 480 is specifically a cylinder or a motor. When the driving component 480 is a cylinder, a connecting rod of the cylinder is fixedly connected to the second bracket 430 as a driving end 481; or when the driving component 480 is a motor, a driving shaft of the motor is fixedly connected to the second bracket 430 as a driving end 481.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A support apparatus, comprising:
a stylus fastener configured to fasten a stylus, wherein a magnet of the stylus comprises a first wall surface and a second wall surface facing away from the first wall surface, and a polarity of the first wall surface is opposite to that of the second wall surface,
wherein the stylus fastener comprises an annular body and a mounting space formed by the annular body,
wherein the annular body comprises:
an inner wall surface that faces the mounting space;
an outer wall surface that faces away from the inner wall surface; and
a plurality of magnets disposed around an X axis to enclose the annular body, wherein a direction of magnetic lines of the annular body is from the inner wall surface to the outer wall surface or from the outer wall surface to the inner wall surface,
wherein the inner wall surface has a first polarity, the outer wall surface has a second polarity, and the first polarity is opposite to the second polarity,
wherein the mounting space is configured to receive the stylus in an X-axis direction, such that the stylus fastener is sleeved onto a periphery of the stylus, and the X-axis direction is a length direction of the support apparatus,
wherein both the first wall surface and the second wall surface of the stylus are disposed opposite to the inner wall surface when the mounting space receives the stylus, and
wherein a first magnetic force is generated between the first wall surface and the inner wall surface, a second magnetic force is generated between the second wall surface and the inner wall surface, and the first magnetic force and the second magnetic force have a difference, such that the stylus can be magnetically fastened to the stylus fastener by the magnet of the stylus.

2. The support apparatus of claim 1, wherein the first magnetic force is greater than the second magnetic force, and the first magnetic force is a magnetic adsorption force.

3. The support apparatus of claim 2, wherein the second magnetic force is a magnetic repulsion force, and a direction of the first magnetic force is the same as a direction of the second magnetic force.

4. The support apparatus of claim 2, wherein magnetic lines of the annular body are evenly distributed in an extension direction of the annular body, and in a direction perpendicular to an X axis, and wherein a distance between the first wall surface and the inner wall surface is a first distance, a distance between the second wall surface and the inner wall surface is a second distance, and the first distance is less than the second distance.

5. The support apparatus of claim 2, wherein in a direction around an X axis, the inner wall surface comprises a first area and a second area, and a density of magnetic lines of the first area is greater than a density of magnetic lines of the second area, and wherein in a direction perpendicular to the X axis, the first wall surface is opposite to a part of the first area or all of the first area, and the second wall surface is opposite to a part of the second area or all of the second area.

6. The support apparatus of claim 1, wherein the second magnetic force is greater than the first magnetic force, and the second magnetic force is a magnetic adsorption force.

7. The support apparatus of claim 6, wherein the first magnetic force is a magnetic repulsion force, and a direction of the magnetic adsorption force is the same as a direction of the magnetic repulsion force.

8. The support apparatus of claim 6, wherein magnetic lines of the annular body are evenly distributed in an extension direction of the annular body, and wherein in a direction perpendicular to an X axis, a distance between the first wall surface and the inner wall surface is a first distance, a distance between the second wall surface and the inner wall surface is a second distance, and the first distance is greater than the second distance.

9. The support apparatus of claim 6, wherein in a direction around an X axis, the inner wall surface comprises a first area and a second area, and a density of magnetic lines of the first area is less than a density of magnetic lines of the second area, and wherein the first wall surface is opposite to a part of the first area or all of the first area, and the second wall surface is opposite to a part of the second area or all of the second area.

10. The support apparatus of claim 1, wherein widths of the first wall surface, the second wall surface, and the inner wall surface are the same in the X-axis direction.

11. The support apparatus of claim 1, wherein lengths of the plurality of magnets are the same in a direction around the X axis.

12. The support apparatus of claim 1, comprising a plurality of stylus fasteners, each comprising an annular body and a mounting space formed by the annular body, wherein the mounting spaces of the plurality of stylus fasteners are coaxially disposed.

13. The support apparatus of claim 12, wherein the plurality of stylus fasteners are equally spaced in the X-axis direction.

14. The support apparatus of claim 1, wherein the first polarity is an S pole, and the second polarity is an N pole.

15. The support apparatus of claim 1, further comprising:
a main body;
a connecting part; and
a support frame connected to the main body by the connecting part, wherein the support frame is configured to be folded or unfolded with respect to the main body,
wherein the stylus fastener is disposed on the main body, the support frame, or the connecting part.

16. The support apparatus of claim 15, wherein the connecting part comprises an accommodating groove for accommodating the stylus, a notch of the accommodating groove faces a side of the support apparatus in the X-axis direction, and the stylus fastener is mounted in the accommodating groove.

17. The support apparatus of claim 16, wherein the outer wall surface comprises a first plane, a second plane is disposed on a wall of the accommodating groove, and the first plane is attached and fastened to the second plane.

18. The support apparatus of claim 15, wherein the main body comprises a housing, the housing comprises a first mounting surface and a first appearance surface that faces away from the first mounting surface, and the first mounting surface faces the support frame when the support frame is folded with respect to the main body, and wherein the stylus fastener is disposed on the first appearance surface.

19. The support apparatus of claim 15, wherein the support frame comprises a second mounting surface and a second appearance surface that faces away from the second mounting surface, and the second mounting surface faces the main body when the support frame is folded with respect to the main body, and wherein the stylus fastener is disposed on the second appearance surface.

* * * * *